United States Patent
Alam et al.

(10) Patent No.: US 11,575,423 B1
(45) Date of Patent: Feb. 7, 2023

(54) ESTABLISHING AND REFINING BEAMS IN MIMO SESSIONS

(71) Applicant: AT&T Mobility II LLC, Atlanta, GA (US)

(72) Inventors: Iftekhar Alam, Roswell, GA (US); Effendi Jubilee, Gaithersburg, MD (US); Ming-Ju Ho, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 17/557,183

(22) Filed: Dec. 21, 2021

(51) Int. Cl.
*H04B 7/06* (2006.01)
*H04W 64/00* (2009.01)

(52) U.S. Cl.
CPC ........ *H04B 7/0617* (2013.01); *H04W 64/006* (2013.01)

(58) Field of Classification Search
CPC ........................... H04B 7/0617; H04W 64/006
USPC .............................................. 375/267
See application file for complete search history.

(56) References Cited

U.S. PATENT DOCUMENTS

| 10,756,786 B1 * | 8/2020 | Ben-Shlomo ........ | H04B 7/0413 |
| 2019/0150003 A1 * | 5/2019 | He ...................... | H04B 7/0617 342/368 |

* cited by examiner

*Primary Examiner* — Fitwi Y Hailegiorgis
(74) *Attorney, Agent, or Firm* — Hartman & Citrin LLC

(57) ABSTRACT

Establishing and refining beams in MIMO sessions can include detecting establishment of a communication session between a cell site and a user equipment. The communication session can be conducted using a multi-input multi-output beam that can be supported by a first portion of an antenna array, the first portion including two or more antenna array elements of the antenna array. Device data that relates to the user equipment can be obtained, where the device data can include movement data that can describe a movement of the user equipment. A beamforming command can be generated to include instructions that, when implemented by an entity associated with the cell site, can cause the cell site to refine the multi-input multi-output beam based on the device data. A refined multi-input multi-output beam can be supported by a second portion of the antenna array. The beamforming command can be provided to the cell site.

20 Claims, 8 Drawing Sheets

ESTABLISHING AND REFINING BEAMS IN MIMO SESSIONS

BACKGROUND

In multi-user multi-input multi-output sessions, beam assignment can be an iterative process. A base station can initiate communications using a broadcast beam that then can be refined into one or more narrower beams based on reports from or about user equipment communicating in the session. Such an approach is not suitable for user equipment that moves, as each time a user equipment moves out of a line of sight of the antenna with which it communicates, the beam must be reestablished. Such beam reestablishment is a time consuming, iterative, and resource-consuming process. Such an approach is not an efficient use of network resources and can result in a poor user experience.

SUMMARY

The present disclosure is directed to establishing and refining beams in multi-input multi-output ("MIMO") sessions. A voice and/or data session ("communication session") can be established between a user equipment and a cell site. The session can include a voice session and/or a data session. The session can be supported by a beam generated during wireless communications between the cell site and the user equipment, where the MIMO beam can be generated by one or more antenna array elements of an antenna array. The MIMO beamforming service can be configured to detect establishment of the session and to obtain device data associated with the user equipment. The device data can include contextual data that can describe what type of data or content is being transmitted in the session and that information can be used to determine resource needs of the user equipment for this session. The device data also can include location data that can describe one or more movements (e.g., including geographic location, trajectory, etc.) of the user equipment; power levels and/or charge status associated with the user equipment, and/or other information relevant to the needs of the user equipment within the session at issue.

The MIMO beamforming service can determine if the user equipment is stationary or non-stationary. Based on a determination that the user equipment is stationary, the MIMO beamforming service can generate one or more beamforming commands that, when implemented by the cell site, can cause the cell site to refine the MIMO beam to a particular level of refinement (e.g., a defined number of antenna array elements or the like). The obtaining of the device data and the generating of the MIMO beamforming commands can be iterated until the MIMO beamforming service determines, in any iteration of this process, that the user equipment is non-stationary or that the user equipment is mobile.

Based on a determination that the user equipment is mobile, the MIMO beamforming service can determine, based on the device data, one or more movements, trajectories, and/or activities associated with the user equipment and can determine a beam focus level based on these determinations. As noted above, the MIMO beam focus level can be changed based on movements of the user equipment and needs of the user equipment. The MIMO beamforming service can determine how the MIMO beam should be focused and can generate one or more beamforming commands for delivery to the cell site.

After delivering the MIMO beamforming commands to the cell site, the MIMO beamforming service can determine (at some future time) if the MIMO beam should be moved or modified. If the MIMO beamforming service makes such a determination, the MIMO beamforming service can again obtain the device data and the MIMO beam refinement process can be reiterated. According to various embodiments of the concepts and technologies disclosed herein the MIMO beam can be flexibly narrowed and widened to meet customer needs or customer experience commitments while minimizing resource usage associated with the cell site. It should be understood that this example is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include detecting establishment of a communication session between a cell site and a user equipment. The communication session can be conducted using a multi-input multi-output beam that can be supported by a first portion of an antenna array. The first portion can include two or more antenna array elements of the antenna array. The operations further can include obtaining device data that relates to the user equipment. The device data can include movement data that can describe a movement of the user equipment. The operations further can include generating a beamforming command that can include instructions that, when implemented by an entity associated with the cell site, causes entity to refine the multi-input multi-output beam based on the device data. A refined multi-input multi-output beam can be supported by a second portion of the antenna array. The operations further can include providing the beamforming command to the cell site.

In some embodiments, the movement data can describe a direction of travel of the user equipment and a speed of travel of the user equipment. In some embodiments, the operations further can include determining, based on the device data, if the user equipment is stationary; and generating the beamforming command in response to a determination that the user equipment is stationary. The beamforming command can cause the entity to deactivate a first antenna element that is included in the first portion of the antenna array and that is not included in the second portion of the antenna array. In some embodiments, the operations further can include determining, based on the device data, if the user equipment is stationary; and in response to a determination that the user equipment is not stationary, identifying or predicting movements of the user equipment, determining a beam focus level, and generating the beamforming command. The beamforming command can cause the entity to deactivate a first antenna element that is included in the first portion of the antenna array and that is not included in the second portion of the antenna array.

In some embodiments, the operations further can include determining, based on the device data, if the multi-input multi-output beam should be modified; and generating the beamforming command in response to a determination that the multi-input multi-output beam should be modified. The beamforming command can cause the entity to deactivate a first antenna element that is included in the first portion of the antenna array and that is not included in the second portion of the antenna array.

In some embodiments, the first portion of the antenna array can include a first antenna array element of the antenna array, and the second portion of the antenna array can include a second antenna array element of the antenna array. In some embodiments, the first portion of the antenna array can include a first antenna array element and does not include a second antenna array element, and the second portion of the antenna array can include the second antenna array element and does not include the first antenna array element. In some embodiments, the first portion of the antenna array can include a first antenna array element of a first antenna array that includes the antenna array, and the second portion of the antenna array can include a second antenna array element of a second antenna array that does not include the antenna array.

In some embodiments, the operations further can include determining, based on the device data, if the multi-input multi-output beam should be modified; and generating the beamforming command in response to a determination that the multi-input multi-output beam should be modified. The beamforming command can cause the cell site to change an aim of a first antenna element that is included in the first portion of the antenna array. In some embodiments, the operations further can include determining, based on the device data, if the multi-input multi-output beam should be modified; and generating the beamforming command in response to a determination that the multi-input multi-output beam should be modified. The beamforming command can cause the cell site to change a power level of a first antenna element that is included in the first portion of the antenna array.

According to another aspect of the concepts and technologies disclosed herein, a method is disclosed. The method can include detecting establishment of a communication session between a cell site and a user equipment. The communication session can be conducted using a multi-input multi-output beam that can be supported by a first portion of an antenna array, the first portion including two or more antenna array elements of the antenna array. The method further can include obtaining device data that relates to the user equipment, where the device data can include movement data that can describe a movement of the user equipment. The method further can include generating a beamforming command that can include instructions that, when implemented by an entity associated with the cell site, can cause the cell site to refine the multi-input multi-output beam based on the device data. A refined multi-input multi-output beam can be supported by a second portion of the antenna array. The method further can include providing the beamforming command to the cell site.

In some embodiments, the movement data can describe a direction of travel of the user equipment and a speed of travel of the user equipment. In some embodiments, the operations further can include determining, based on the device data, if the user equipment is stationary; and generating the beamforming command in response to a determination that the user equipment is stationary. The beamforming command can cause the entity to deactivate a first antenna element that is included in the first portion of the antenna array and that is not included in the second portion of the antenna array.

In some embodiments, the operations further can include determining, based on the device data, if the user equipment is stationary; and in response to a determination that the user equipment is not stationary, identifying or predicting movements of the user equipment, determining a beam focus level, and generating the beamforming command. The beamforming command can cause the entity to deactivate a first antenna element that is included in the first portion of the antenna array and that is not included in the second portion of the antenna array.

In some embodiments, the operations further can include determining, based on the device data, if the multi-input multi-output beam should be modified; and generating the beamforming command in response to a determination that the multi-input multi-output beam should be modified. The beamforming command can cause the entity to deactivate a first antenna element that is included in the first portion of the antenna array and that is not included in the second portion of the antenna array.

According to yet another aspect of the concepts and technologies disclosed herein, a computer storage medium is disclosed. The computer storage medium can store computer-executable instructions that, when executed by a processor, cause the processor to perform operations. The operations can include detecting establishment of a communication session between a cell site and a user equipment. The communication session can be conducted using a multi-input multi-output beam that can be supported by a first portion of an antenna array. The first portion can include two or more antenna array elements of the antenna array. The operations further can include obtaining device data that relates to the user equipment. The device data can include movement data that can describe a movement of the user equipment. The operations further can include generating a beamforming command that can include instructions that, when implemented by an entity associated with the cell site, causes entity to refine the multi-input multi-output beam based on the device data. A refined multi-input multi-output beam can be supported by a second portion of the antenna array. The operations further can include providing the beamforming command to the cell site.

In some embodiments, the movement data can describe a direction of travel of the user equipment and a speed of travel of the user equipment. In some embodiments, the operations further can include determining, based on the device data, if the user equipment is stationary; and generating the beamforming command in response to a determination that the user equipment is stationary. The beamforming command can cause the entity to deactivate a first antenna element that is included in the first portion of the antenna array and that is not included in the second portion of the antenna array. In some embodiments, the operations further can include determining, based on the device data, if the user equipment is stationary; and in response to a determination that the user equipment is not stationary, identifying or predicting movements of the user equipment, determining a beam focus level, and generating the beamforming command. The beamforming command can cause the entity to deactivate a first antenna element that is included in the first portion of the antenna array and that is not included in the second portion of the antenna array.

In some embodiments, the operations further can include determining, based on the device data, if the multi-input multi-output beam should be modified; and generating the beamforming command in response to a determination that the multi-input multi-output beam should be modified. The beamforming command can cause the entity to deactivate a first antenna element that is included in the first portion of the antenna array and that is not included in the second portion of the antenna array.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1A:
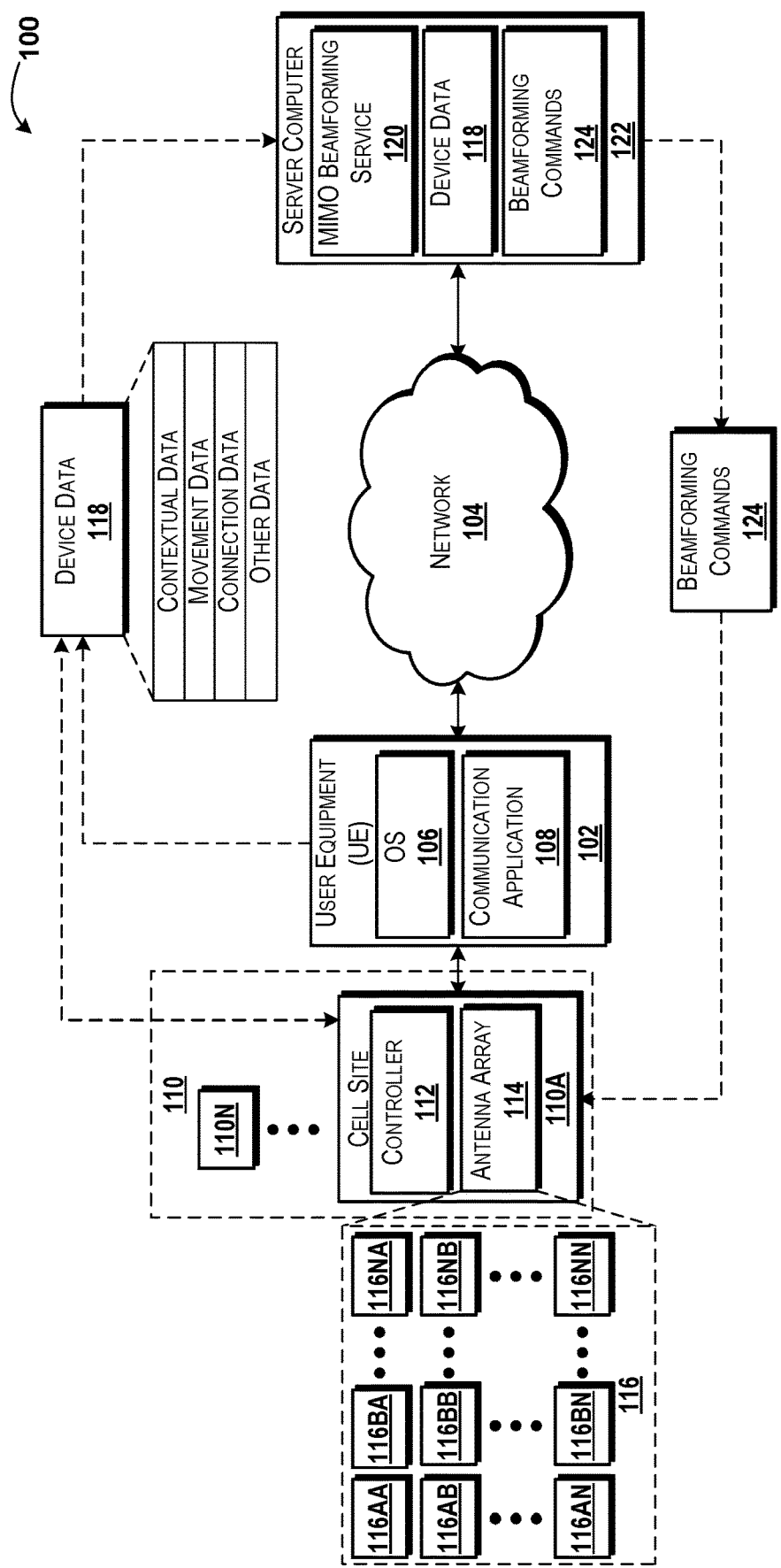
FIG. 1A is a system diagram that illustrates an illustrative operating environment for various embodiments of the concepts and technologies described herein.

The following detailed description is directed to establishing and refining beams in MIMO sessions. A data or voice session can be established between a user equipment and a cell site. The session can include a voice session and/or a data session. The session can be supported by a beam generated during wireless communications between the cell site and the user equipment, where the MIMO beam can be generated by one or more antenna array elements of an antenna array. The MIMO beamforming service can be configured to detect establishment of the session and to obtain device data associated with the user equipment. The device data can include contextual data that can describe what type of data or content is being transmitted in the session and that information can be used to determine resource needs of the user equipment for this session. The device data also can include location data that can describe on or more movements (e.g., including geographic location, trajectory, etc.) of the user equipment; power levels and/or charge status associated with the user equipment, and/or other information relevant to the needs of the user equipment within the session at issue.

The MIMO beamforming service can determine if the user equipment is stationary or non-stationary. Based on a determination that the user equipment is stationary, the MIMO beamforming service can generate one or more beamforming commands that, when implemented by the cell site, can cause the cell site to refine the MIMO beam to a particular level of refinement (e.g., a defined number of antenna array elements or the like). The obtaining of the device data and the generating of the MIMO beamforming commands can be iterated until the MIMO beamforming service determines, in any iteration of this process, that the user equipment is non-stationary or that the user equipment is mobile.

Based on a determination that the user equipment is mobile, the MIMO beamforming service can determine, based on the device data, one or more movements, trajectories, and/or activities associated with the user equipment and can determine a beam focus level based on these determinations. As noted above, the MIMO beam focus level can be changed based on movements of the user equipment and needs of the user equipment. The MIMO beamforming service can determine how the MIMO beam should be focused and can generate one or more beamforming commands for delivery to the cell site.

After delivering the MIMO beamforming commands to the cell site, the MIMO beamforming service can determine (at some future time) if the MIMO beam should be moved or modified. If the MIMO beamforming service makes such a determination, the MIMO beamforming service can again obtain the device data and the MIMO beam refinement process can be reiterated. According to various embodiments of the concepts and technologies disclosed herein the MIMO beam can be flexibly narrowed and widened to meet customer needs or customer experience commitments while minimizing resource usage associated with the cell site. It should be understood that this example is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1A, aspects of an operating environment 100 for various embodiments of the concepts and technologies disclosed herein for establishing and refining beams in MIMO sessions will be described, according to an illustrative embodiment. The operating environment 100 shown in FIG. 1A includes a user equipment 102. The user equipment 102 can operate in communication with and/or as part of a communications network ("network") 104, though this is not necessarily the case.

According to various embodiments, the functionality of the user equipment 102 may be provided by one or more mobile telephones or smartphones, one or more laptop computers or tablet computers, one or more connected vehicle devices, other computing systems, and the like. For purposes of describing the concepts and technologies disclosed herein, the user equipment 102 is described herein as a smartphone. It should be understood that this embodiment is illustrative, and should not be construed as being limiting in any way.

The user equipment 102 can execute an operating system 106 and one or more application programs such as, for example, a communication application 108. The operating system 106 can include a computer program that can control the operation of the user equipment 102. The communication application 108 can include an executable program that can be configured to execute on top of the operating system 106 to provide various functions as illustrated and described herein for enabling the establishment and/or refinement of beams in MIMO sessions, as will be illustrated and described herein after introducing the other components of the operating environment 100.

As shown in FIG. 1A, the user equipment 102 can be configured to communicate with and/or via equipment located at one or more cell sites 110A-N (hereinafter collectively and/or generically referred to as "cell sites 110"). As is generally understood, the cell sites 110 can include various equipment, hardware, and/or software for providing wireless connectivity for the user equipment 102. Thus, it can be appreciated that the cell sites 110 can be associated with one or more service providers, in some embodiments. In the illustrated embodiment shown in FIG. 1A, the user equipment 102 is illustrated as communicating with and/or via the cell site 110A, and the cell site 110A is illustrated as including a controller 112 and an antenna array 114.

The controller 112 can include a real and/or virtualized computing device that can execute one or more applications, modules, and/or services for controlling the antenna array 114 and/or communications occurring using the antenna array 114. As such, it can be appreciated that the controller 112 can be configured to control the antenna array 114 and/or other hardware and/or software associated with the cell site 110 such as, for example, one or more radios, antennas, combiners, etc. Because the types of hardware and/or software associated with the cell sites 110 can vary based on upon various aspects of the cell sites 110 (e.g., the standards being implemented by the cell sites 110, the hardware and/or software vendors involved, the service providers involved, etc.), it should be understood that the above-noted examples are illustrative of resources that can be controlled by the controller 112 and are not exhaustive. Furthermore, in some embodiments the cell sites 110 can be provided by virtualized resources, and therefore the controller 112 can be configured as a virtual resource controller in some embodiments. As such, it should be understood that the above examples are illustrative, and therefore should not be construed as being limiting in any way.

As generally is understood, the antenna array 114 can include various numbers of antenna array elements 116AA-NN (hereinafter collectively and/or generically referred to as "antenna array elements 116"). In various embodiments of the concepts and technologies disclosed herein, the antenna array elements 116 can be independently controlled and therefore power levels, frequencies, directional aim, etc., of the respective antenna array elements 116 can be controlled by the controller 112. The number of antenna array elements 116 can vary based on various considerations including standards being used, manufactures of the antenna arrays 114, etc. In some contemplated embodiments of the concepts and technologies disclosed herein, the antenna arrays 114 can be configured to support MIMO sessions (between the cell sites 110 and the user equipment 102 and/or other devices) and therefore can have sixty-four, one hundred twenty-eight, and/or even more antenna array elements 116 that can be controlled in groups of one or more antenna array elements 116. It should be understood that this example is illustrative, and therefore should not be construed as being limiting in any way.

As generally is understood, one antenna array element 116 may be enough to support communications for a particular device such as, for example, the user equipment 102, if aimed correctly (at the user equipment 102). Because a user equipment 102 may be mobile, however, it previously has not been practical to aim a particular antenna array element 116 at the user equipment 102 to support the session. Furthermore, as the MIMO beam is narrowed down to one or even a few antenna array elements 116, any movement or other disruption to the communications has previously meant that the narrowing down of the MIMO beam (from an entire antenna array 114 and/or other large collection of antenna array elements 116) has required a return to a beginning of the process (starting with a broadest set of the antenna array elements 116 and narrowing down to the smallest number of antenna array elements 116 that can support the communications).

Embodiments of the concepts and technologies disclosed herein enable the controller 112 to track a user equipment 102 and support MIMO sessions with a narrow beam (e.g., using as few antenna array elements 116 as possible while still meeting service commitments for communications via the cell site 110) being generated between the cell site 110 and the user equipment 102, as will be illustrated and described in more detail herein. If changes are made to the MIMO beam due to movements of the user equipment 102 and/or for other reasons, embodiments of the process as illustrated and described herein can avoid having to reiterate the narrowing of the MIMO beam from the beginning of the narrowing process. Thus, embodiments of the concepts and technologies disclosed herein can enable a narrow beamform to be used and/or modified to provide efficient communications for MIMO sessions without having to start at a broadest level beamform as previously has been done. It should be understood that this example is illustrative, and therefore should not be construed as being limiting in any way.

Figure 1B:
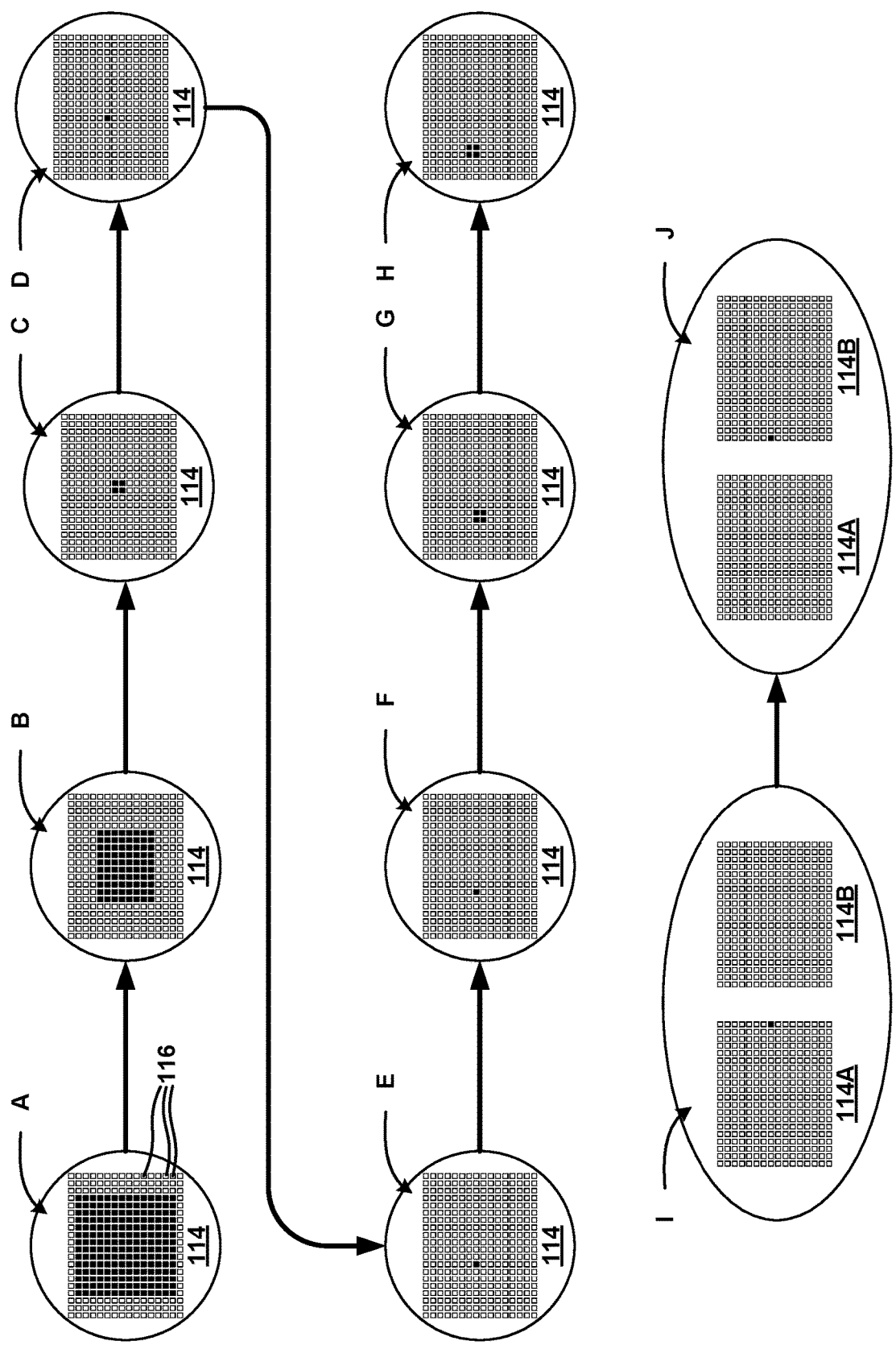
FIG. 1B is a line drawing schematically illustrating establishing and refining beams in MIMO sessions, according to an illustrative embodiment of the concepts and technologies disclosed herein.

Referring briefly to FIG. 1B, an example beamforming process as illustrated and described herein will be described, according to one example embodiment. In the circles labeled A-H, a portion of an example antenna array 114 is shown, with active antenna array elements 116 being illustrated as being filled in black and inactive antenna array elements 116 being illustrated as being filled in white. It should be understood that this example is illustrative, and therefore should not be construed as being limiting in any way.

It can be appreciated that the progression shown in circles A-C can be substantially similar to how a beamform can be narrowed in accordance with modern technologies; where a broad beam is narrowed down progressively to deactivate as many antenna array elements 116 as possible while still supporting communications between the antenna array 114 and a user equipment 102. As shown in the circle D, the MIMO beamform has been narrowed to a single active antenna array element 116 and shifted (relative to the center of the original broad beamform). It should be understood that this example is illustrative, and therefore should not be construed as being limiting in any way.

Circles E-H illustrate additional aspects of the concepts and technologies disclosed herein. Namely, these circles illustrate how one or more previously active antenna array elements 116 (e.g., the single active antenna array element 116 shown as active in circle E) can be deactivated and one or more previously inactive antenna array elements 116

(e.g., the antenna array element 116 next to the active antenna array element 116 shown in circle E) can be activated. Thus, it can be appreciated that a session supported by one antenna array element 116 at a first time $t_1$ can be transferred to a new antenna array element 116 at a second time $t_2$. Circles G-H illustrate additional modifications that can occur including broadening the MIMO beamform; shifting the MIMO beamform; and/or otherwise modifying the MIMO beamform. It should be understood that handoffs between a first antenna array element 116 of a first antenna array 114 and a second antenna array element 116 of a second antenna array 114 can be occur as well. It should be understood that this example is illustrative, and therefore should not be construed as being limiting in any way.

Circles I-J illustrate additional aspects of the concepts and technologies disclosed herein. Namely, these circles illustrate how one or more previously active antenna array elements 116 of a first cell site 114A (e.g., the single active antenna array element 116 of cell site 114A, which is shown as active in circle I) can be deactivated and one or more previously inactive antenna array elements 116 (e.g., an antenna array element 116 of the cell site 114B as shown in circle J) can be activated. Thus, it can be appreciated that a session supported by a first antenna array element 116 of a first cell site 114A at a first time $t_1$ can be transferred to a second antenna array element 116 of a second cell site 114B at a second time $t_2$. It should be understood that this example is illustrative, and therefore should not be construed as being limiting in any way.

To support these and other embodiments of beamforming in accordance with the concepts and technologies disclosed herein, device data 118 can be provided by the user equipment 102 and/or the cell sites 110 to one or more services, applications, and/or other functionality for determining how beams should be modified and/or moved to support communications between the cell sites 110 and the user equipment 102. In particular, the illustrated embodiment of the operating environment 100 can include a MIMO beamforming service 120, which can be hosted and/or executed by a server computer 122 or other computing device. In various embodiments of the concepts and technologies disclosed herein, the functionality of the server computer 122 can be provided by one or more server computers, web servers, desktop computers, laptop computers, other computing systems, and the like. For purposes of describing the concepts and technologies disclosed herein, the server computer 122 is described herein as an application server. It should be understood that this embodiment is illustrative, and should not be construed as being limiting in any way.

According to various embodiments of the concepts and technologies disclosed herein, the MIMO beamforming service 120 can obtain the device data 118 from the user equipment 102 and/or the cell sites 110 (e.g., from one or more network monitors and/or other hardware and/or software associated with the cell sites 110). According to various embodiments of the concepts and technologies disclosed herein, the device data 118 can include contextual data, movement data, connection data, and/or other data.

The contextual data can include data and/or other information that can be used to describe contextual state information associated with the user equipment 102. The contextual data can describe, for example, a type of use the user equipment 102 is making of the network such as, for example, a voice call, a video call, an Internet browsing session, a streaming data or audio session, etc. It can be appreciated that the type of data or voice session can affect the needs of the user equipment 102 with respect to the data or voice session, and may be used by the MIMO beamforming service 120 to determine the number of antenna array elements 116 to dedicate to the connection as a delay in delivering data would adversely affect the customer experience more in a streaming video session (for example) than for an Internet browsing session. As such, the MIMO beamforming service 120 can be configured, in some embodiments, to narrow or widen the MIMO beam (e.g., by dedicating fewer or more, respectively, antenna array elements 116) based on the activity of the user equipment 102. It should be understood that this example is illustrative, and therefore should not be construed as being limiting in any way.

The contextual data also can describe the device usage and/or battery information. Thus, for example, the contextual data can indicate what other processes or activities are being conducted with the user equipment 102 in addition to the data or voice session, whether the user equipment 102 is being charged, and/or a battery level associated with the user equipment 102. In some embodiments, the battery level and/or the current charge status can affect the ability of the user equipment 102 to communicate with the antenna array 114 (as a fully charged or charging user equipment 102 may have the ability to dedicate additional power to the transceiver of the user equipment 102, thereby improving reception, etc.). Thus, in some embodiments the MIMO beamforming service 120 can be configured to narrow or widen the MIMO beam (e.g., by dedicating fewer or more, respectively, antenna array elements 116) based on the device usage, other device usage, and/or battery information associated with the user equipment 102. It should be understood that this example is illustrative, and therefore should not be construed as being limiting in any way.

The movement data can indicate movements of the user equipment 102. The movements can include a current geographical location associated with the user equipment 102 (e.g., global positioning system ("GPS") coordinates of the user equipment 102, a cell site 110, WiFi SSID, or other networking device with which the user equipment 102 communicates, etc.); whether the user equipment 102 is stationary or mobile; a trajectory (direction and speed of movement) of the user equipment 102 if mobile; orientation of the user equipment 102 (e.g., a three-dimensional orientation of the user equipment 102); a distance between the user equipment 102 and one or more antenna array elements 116 supporting a session with the user equipment 102; and/or other movements of the user equipment 102. In some embodiments, the MIMO beamforming service 120 can be configured to narrow or widen the MIMO beam (e.g., by dedicating fewer or more, respectively, antenna array elements 116) based on the movement data associated with the user equipment 102. It should be understood that this example is illustrative, and therefore should not be construed as being limiting in any way.

The connection data can describe various connection parameters associated with a data or voice session between the antenna array 114 and the user equipment 102. Thus, the connection data can describe, among other things, a number of antenna array elements 116 supporting the session, power levels of the one or more antenna array elements 116, frequencies and/or channels associated with the session, and/or other aspects of the session. In some embodiments, the MIMO beamforming service 120 can be configured to narrow or widen the MIMO beam (e.g., by dedicating fewer or more, respectively, antenna array elements 116) based on the connection data associated with the user equipment 102.

It should be understood that this example is illustrative, and therefore should not be construed as being limiting in any way.

The other data can include various other information that can be used to understand data and/or voice session needs for a session between the antenna array 114 and the user equipment 102. As such, the other data can include any information that may be used by the MIMO beamforming service 120 as illustrated and described herein that is not separately defined herein such as, for example, a brand or model associated with the user equipment 102; an identity associated with the user equipment 102; a connection history associated with the user equipment 102; and/or other types of information. Because the other data can include additional information not explicitly illustrated and described herein, it should be understood that the illustrated embodiments of the other data are illustrative and should not be construed as being limiting in any way.

The MIMO beamforming service 120 can be configured to detect the establishment of a voice or data session between a cell site 110 and a user equipment 102. The MIMO beamforming service 120 can be configured to obtain, for the user equipment 102 involved in the detected session, the device data 118. In some embodiments, the MIMO beamforming service 120 can obtain the device data 118 from one or more of the cell sites 110 and/or from one or more devices such as, for example, the user equipment 102. In some other embodiments, the device data 118 can be provided to the server computer 122 (and the MIMO beamforming service 120) by the user equipment 102, the cell sites 110, and/or other devices or entities. As will be explained in more detail below, the device data 118 can be collected by the user equipment 102 at the direction, in some embodiments, of the communication application 108, though this is not necessarily the case in all embodiments.

Based on the device data 118, the MIMO beamforming service 120 can be configured to determine if the user equipment 102 is stationary (or non-mobile) or if the user equipment 102 is mobile (or non-stationary). If the MIMO beamforming service 120 determines that the user equipment 102 is stationary, the MIMO beamforming service 120 can be configured to generate a beamforming command 124 that, when implemented by the cell site 110 and/or a device thereof, causes the refinement of the MIMO beam to a specified level (e.g., number) of antenna array elements 116. The MIMO beamforming commands 124 can include commands, instructions, and/or information that can inform the cell site 110 (or a controller 112 thereof) regarding the MIMO beamforming determinations made by the MIMO beamforming service 120.

Thus, for example, a stationary user equipment 102 can be supported by a small number of, or even a single, antenna array element 116 in various embodiments as the user equipment 102 may remain in the line of sight of the single antenna array element 116 as long as the user equipment 102 remains stationary. Thus, the MIMO beamforming service 120 may be configured to generate a beamforming command 124 that can cause the cell site 110 (or a device thereof) to narrow the MIMO beam to the determined number of antenna array elements 116, in some embodiments, to support the communications between the user equipment 102 and the cell site 110. The MIMO beamforming service 120 can deliver (or effect delivery of) the MIMO beamforming commands 124 to the cell site 110 and the cell site 110 can effect refinement of the MIMO beam. After sending the MIMO beamforming commands 124 to the cell site 110, the MIMO beamforming service 120 can be configured to obtain another iteration or release of the device data 118 and/or can wait to receive another release of the device data 118. It should be understood that this example is illustrative, and therefore should not be construed as being limiting in any way.

If the MIMO beamforming service 120 determines that the user equipment 102 is non-stationary (or mobile), the MIMO beamforming service 120 can be configured to identify (from the device data 118) or predict (based on the device data 118) one or more movements of the user equipment 102, a trajectory of the user equipment 102, and/or an activity of the user equipment 102. Thus, for example, the MIMO beamforming service 120 can be configured to determine how the user equipment 102 is moving relative to the cell site 110 (and/or relative to the one or more antenna array elements 116 that are supporting the session). The MIMO beamforming service 120 also can be configured to determine how the user equipment 102 is being used and/or an associated battery level, charging status, data need of the user equipment 102, etc. Thus, it can be appreciated that the MIMO beamforming service 120 can be configured to determine how the user equipment 102 is moving relative to the cell site 110 and/or relative to the one or more antenna array elements 116 that support the session. It should be understood that this example is illustrative, and therefore should not be construed as being limiting in any way.

Based on the movements, trajectories, and activity associated with the user equipment 102, the MIMO beamforming service 120 can be configured to determine a beam focus level for the MIMO beam between the cell site 110 and the user equipment 102. Thus, for example, the MIMO beamforming service 120 can determine a speed of movement (relative to the cell site 110) of the user equipment 102, a direction of the movement of the user equipment 102 (relative to the cell site 110), etc. The MIMO beamforming service 120 can be configured to determine, based on these determinations, how the MIMO beam should be refined. For example, the MIMO beamforming service 120 can be configured to determine that a relatively fast-moving user equipment 102 may ideally be supported using a beam provided by four antenna array elements 116 (for example) as the connection provided by such a beam is less likely to be interrupted during movement of the user equipment 102 relative to a beam provided by only a single antenna array element 116. Other numbers of antenna array elements 116 are possible and are contemplated, so this example should not be construed as being limiting in any way. Alternatively, the MIMO beamforming service 120 can be configured to determine that a slowly-moving user equipment 102 may be supported by a beam provided by a single antenna array element 116 and/or some other number of antenna array elements 116 without negatively impacting the user experience.

As such, it can be appreciated that the MIMO beamforming service 120 can be configured to determine the MIMO beam focus level based on a balance of resource needs (e.g., the type of data connection, movements of the user equipment 102, activity and/or context of the connection, power levels associated with the session, distance between the cell site 110 and the user equipment 102, etc.) against a desire to minimize resource usage associated with the cell site 110. Thus, the MIMO beamforming service 120 can be configured to refine the stationary beam associated with the session between the cell site 110 and the user equipment 102 as narrow as possible while meeting a service commitment and/or need. It should be understood that this example is illustrative, and therefore should not be construed as being limiting in any way.

After the MIMO beamforming service 120 determines the MIMO beam focus level that is ideal for the session, the MIMO beamforming service 120 can effect the refinement of the MIMO beam in accordance with the determined beam focus level. Unlike other technologies for beamforming, the MIMO beamforming service 120 can be configured to effect the narrowing or widening of the MIMO beam without having to cause the cell site 110 to reiterate the initial beam establishment process often used by other service providers. Namely, other service providers may refine beams by first establishing the MIMO beam by dedicating an entire antenna array 114 to a beam for a session between the cell site 110 and the user equipment 102 and then narrowing the MIMO beam down to a specified number of antenna array elements 116. In such embodiments, if the needs associated with the user equipment 102 change, or if the MIMO beam is lost (e.g., if the user equipment 102 moves out of range of the antenna array elements 116 supporting the MIMO beam, moves out of a line of sight of the antenna array elements 116 supporting the MIMO beam, etc.), the cell site 110 may have to rededicate the entire antenna array 114 to the MIMO beam and again narrow down the MIMO beam to a defined number of antenna array elements 116. This iterative process uses a great deal of resources, takes time to iterate, and can adversely affect the customer experience. Embodiments of the concepts and technologies disclosed herein, however, can be configured to flexibly allocate or de-allocate antenna array elements 116 based on the movements and/or needs of the user equipment 102 as explained herein without having to iterate the dedication of the antenna array 114 and subsequent narrowing as explained above. Thus, embodiments of the concepts and technologies disclosed herein can be used to conserve resources while meeting customer service and customer experience commitments, in some embodiments.

Upon determining how the MIMO beam should be narrowed, the MIMO beamforming service 120 can generate one or more beamforming commands 124. The MIMO beamforming commands 124 can include commands, instructions, and/or information that can inform the cell site 110 (or a controller 112 thereof) regarding the MIMO beamforming determinations made by the MIMO beamforming service 120. Namely, the MIMO beamforming commands 124 can include instructions, commands, or other information that, when received by the cell site 110 and/or other entities associated with the cell site 110 (e.g., the controller 112), can trigger manipulation of the antenna array 114 that is supporting a connection between the user equipment 102 and the cell site 110.

For example, the implementation of the MIMO beamforming commands 124 by the cell site 110 and/or elements thereof can result in the allocation or de-allocation of one or more antenna array elements 116, the tilting (in any axis) of one or more of the antenna array elements 116, an increase or decrease in power levels of the one or more antenna array elements 116, combinations thereof, or the like. Thus, the MIMO beamforming service 120 can, via generating and delivering the MIMO beamforming commands 124, cause the manipulation of various aspects of the connection used by the user equipment 102 to communicate with the cell site 110. It should be understood that this example is illustrative, and therefore should not be construed as being limiting in any way.

The controller 112 or other functionality associated with the cell site 110 can implement the MIMO beamforming commands 124 to narrow or widen the MIMO beam in accordance with the determinations of the MIMO beamforming service 120, to tilt or aim one or more antenna array elements 116, to increase or decrease one or more power levels of one or more antenna array elements 116, combinations thereof, or the like. Thus, the MIMO beamforming commands 124 can be implemented by the cell site 110 to modify the MIMO beam associated with the session. It should be understood that this example is illustrative, and therefore should not be construed as being limiting in any way.

It should be understood that the MIMO beamforming service 120 can be configured to reiterate the MIMO beam refinement process illustrated and described herein periodically and/or at determined or set times during the session to continuously refine the MIMO beam associated with the session. Thus, the MIMO beamforming service 120 can generate one or more beamforming commands 124. The MIMO beamforming commands 124 can be configured to minimize resource usage while meeting customer needs and/or commitments. It should be understood that this example is illustrative, and therefore should not be construed as being limiting in any way.

Now that the elements of the operating environment 100 have been introduced, the functionality of the controller 112 will be further elaborated upon in accordance with an example embodiment of the concepts and technologies disclosed herein. The controller 112 can be configured to cause the cell site 110 to establish a voice or data session with a user equipment 102. As illustrated in FIG. 1A, the cell site 110 can include an antenna array 114, and the establishment of the session with the user equipment 102 can include establishing the session using a first level MIMO beam. In some embodiments, the first level MIMO beam may be supported by any number of antenna array elements from two or more antenna array elements 116 to all antenna array elements 116 associated with the antenna array 114. It should be understood that this example is illustrative, and therefore should not be construed as being limiting in any way.

The controller 112 can be configured to obtain, for the user equipment 102 involved in the established session, the device data 118. In some embodiments, the controller 112 can obtain the device data 118 from a network monitor or other device or function of the cell site 110 or from the user equipment 102. Based on the device data 118, the controller 112 can be configured to determine if the user equipment 102 is stationary or non-mobile, or if the user equipment 102 is mobile or non-stationary. If the controller 112 determines that the user equipment 102 is stationary, the controller 112 can be configured to refine the MIMO beam to a specified level (e.g., number) of antenna array elements 116. In some embodiments, the MIMO beam can be refined to a minimum number of antenna array elements 116 while meeting a quality of service need or commitment. As used herein, the word "refine" when used with respect to a beam (or signal) associated with a session can be used to refer to narrowing or widening the MIMO beam by dedicating fewer or more antenna array elements 116 to the MIMO beam used within the communication session; moving a session from one antenna array element 116 to another antenna array element; performing a handoff from one antenna array element 116 of a first cell site 110 to a second antenna array element 116 of a second cell site 110; or the like.

Thus, for example, a stationary user equipment 102 can be supported by a small number of, or even a single, antenna array element 116 in various embodiments as the user equipment 102 may remain in the line of sight of the single antenna array element 116 as long as the user equipment 102 remains stationary. Thus, the controller 112 may be configured to narrow the MIMO beam to the determined number of antenna array elements 116, in some embodiments, to support the communications between the user equipment 102 and the cell site 110. Upon refining the MIMO beam to a desired level, the controller 112 can obtain another release or iteration of the device data 118 and/or can wait to receive another release of the device data 118. It should be understood that this example is illustrative, and therefore should not be construed as being limiting in any way.

If the controller 112 determines that the user equipment 102 is non-stationary (or mobile), the controller 112 can be configured to identify or predict (e.g., based on the device data 118) one or more movements of the user equipment 102, a trajectory of the user equipment 102, and/or an activity of the user equipment 102. Thus, for example, the controller 112 can be configured to determine how the user equipment 102 is moving relative to the cell site 110 (and/or relative to the one or more antenna array elements 116 that are supporting the session). The controller 112 also can be configured to determine how the user equipment 102 is being used and/or an associated battery level, charging status, data need of the user equipment 102, etc. Thus, it can be appreciated that the controller 112 can be configured to determine how the user equipment 102 is moving relative to the cell site 110 and/or relative to the one or more antenna array elements 116 that support the session. It should be understood that this example is illustrative, and therefore should not be construed as being limiting in any way.

Based on the movements, trajectories, and activity associated with the user equipment 102, the controller 112 can be configured to determine a beam focus level for the MIMO beam between the cell site 110 and the user equipment 102. Thus, for example, the controller 112 can determine a speed of movement (relative to the cell site 110) of the user equipment 102, a direction of the movement of the user equipment 102 (relative to the cell site 110), etc. The controller 112 can be configured to determine, based on these determinations, how the MIMO beam should be refined. For example, the controller 112 can be configured to determine that a relatively fast-moving user equipment 102 may ideally be supported using a beam provided by four antenna array elements 116 as the connection provided by such a beam is less likely to be interrupted during movement of the user equipment 102 relative to a beam provided by only a single antenna array element 116. Alternatively, the controller 112 can be configured to determine that a slowly-moving user equipment 102 may be supported by a beam provided by a single antenna array element 116 without affecting the user experience.

As such, it can be appreciated that the controller 112 can be configured to determine the MIMO beam focus level based on a balance of resource needs (e.g., the type of data connection, movements of the user equipment 102, activity and/or context of the connection, power levels associated with the session, distance between the cell site 110 and the user equipment 102, etc.) against a desire to minimize resource usage associated with the cell site 110. Thus, the controller 112 can be configured to refine the stationary beam associated with the session between the cell site 110 and the user equipment 102 as narrow as possible while meeting a service commitment and/or need. It should be understood that this example is illustrative, and therefore should not be construed as being limiting in any way.

After the controller 112 determines the MIMO beam focus level that is ideal for the session, the controller 112 can refine the MIMO beam in accordance with the determined beam focus level. Unlike other technologies for beamforming, the controller 112 can be configured to narrow or widen the MIMO beam without having to reiterate the initial beam establishment process often used by other service providers. Namely, beams may be established by dedicating an entire antenna array 114 to a beam for a session between the cell site 110 and the user equipment 102 and then narrowing the MIMO beam down to a specified number of antenna array elements 116 as may be required for other service providers. Such an iterative process that may be used by other providers may consume relatively more resources, may consume time to iterate this process, and may adversely affect the customer experience. Embodiments of the concepts and technologies disclosed herein can allow the flexible allocation and/or de-allocation of antenna array elements 116 based on the movements and/or needs of the user equipment 102 as explained herein without having to iterate the dedication of the antenna array 114 and subsequent narrowing as explained above. Thus, embodiments of the concepts and technologies disclosed herein can be used to conserve resources while meeting customer service and customer experience commitments, in some embodiments.

Upon determining how the MIMO beam should be narrowed, the controller 112 can manipulate the antenna array 114 that is supporting a connection between the user equipment 102 and the cell site 110. For example, manipulations can include allocation or de-allocation of one or more antenna array elements 116, the tilting (in any axis) of one or more of the antenna array elements 116, an increase or decrease in power levels of the one or more antenna array elements 116, combinations thereof, or the like. Thus, the controller 112 can manipulate various aspects of the connection used by the user equipment 102 to communicate with the cell site 110. It should be understood that this example is illustrative, and therefore should not be construed as being limiting in any way.

The controller 112 or other functionality associated with the cell site 110 can narrow or widen the MIMO beam, tilt or aim one or more antenna array elements 116, increase or decrease one or more power levels of one or more antenna array elements 116, combinations thereof, or the like. The controller 112 can be configured to reiterate the MIMO beam refinement process illustrated and described herein periodically and/or at determined or set times during the session to continuously refine the MIMO beam associated with the session. Thus, the controller 112 can minimize resource usage associated with the session while meeting customer needs and/or commitments for the session. It should be understood that this example is illustrative, and therefore should not be construed as being limiting in any way.

In practice, a user equipment 102 can establish a session with a cell site 110. The session can include a voice session and/or a data session. The session can be supported by beam generated during wireless communications between the cell site 110 and the user equipment 102, where the MIMO beam can be generated by one or more antenna array elements 116 of an antenna array 114. The MIMO beamforming service 120 can be configured to detect establishment of the session and to obtain device data 118 associated with the user equipment 102. The device data 118 can include contextual data that can describe what type of data or content is being transmitted in the session and that information can be used to determine resource needs of the user equipment 102 for this session. The device data 118 also can include location data that can describe one or more movements (e.g., including geographic location, trajectory, etc.) of the user equipment 102; power levels and/or charge status associated with the user equipment, and/or other information relevant to the needs of the user equipment 102 within the session at issue.

The MIMO beamforming service 120 can determine if the user equipment 102 is stationary or non-stationary. For stationary user equipment 102, the MIMO beamforming service 120 can generate one or more beamforming commands 124 that, when implemented by the cell site 110, can cause the cell site 110 to refine the MIMO beam for the stationary user equipment 102. The obtaining of the device data 118 and the generating of the MIMO beamforming commands 124 can be iterated until the MIMO beamforming service 120 determines, in any iteration of this process, that the user equipment 102 is non-stationary or that the user equipment 102 is mobile.

Based on a determination that the user equipment 102 is mobile, the MIMO beamforming service 120 can determine, based on the device data 118, one or more movements, trajectories, and/or activities associated with the user equipment 102 and can determine a beam focus level based on these determinations. As noted above, the MIMO beam focus level can be changed based on movements of the user equipment 102 and needs of the user equipment 102. The MIMO beamforming service 120 can determine how the MIMO beam should focused and can generate one or more beamforming commands 124 for delivery to the cell site 110. After delivering the MIMO beamforming commands 124 to the cell site 110, the MIMO beamforming service 120 can determine (at some future time) if the MIMO beam should be moved or modified. If the MIMO beamforming service 120 makes such a determination, the MIMO beamforming service 120 can again obtain the device data 118 and the MIMO beam refinement process can be reiterated. According to various embodiments of the concepts and technologies disclosed herein the MIMO beam can be flexibly narrowed and widened to meet customer needs or customer experience commitments while minimizing resource usage associated with the cell site 110. The controller 112 also can be configured, in some embodiments, to collect and/or report the device data 118. It should be understood that this example is illustrative, and therefore should not be construed as being limiting in any way.

Turning back now to the communication application 108, the communication application 108 can be included in some embodiments to cause the user equipment 102 to collect and/or report the device data 118. In some embodiments, the communication application 108 can monitor activity of the user equipment 102 and create the device data 118 at any time. The device data 118 can be created and/or shared with other devices when events occur (e.g., when a connection is established or changed, when the user equipment 102 moves, etc.) and/or at various times and/or time intervals. Thus, the communication application 108 can be configured to capture the contextual data, to determine location and/or movement of the user equipment 102, to determine charging and/or battery status of the user equipment 102, and/or the like. The communication application 108 can cause the user equipment 102 to report the device data 118 to the server computer 122 and/or the cell sites 110. It should be understood that this example is illustrative, and therefore should not be construed as being limiting in any way.

FIG. 1A illustrates one user equipment 102, one network 104, two cell sites 110, and one server computer 122. It should be understood, however, that various implementations of the operating environment 100 can include zero, one, or more than one user equipment 102; zero, one, or more than one network 104; zero, one, two, or more than two cell sites 110; and zero, one, or more than one server computer 122. As such, the illustrated embodiment should be understood as being illustrative, and should not be construed as being limiting in any way.

Figure 2:
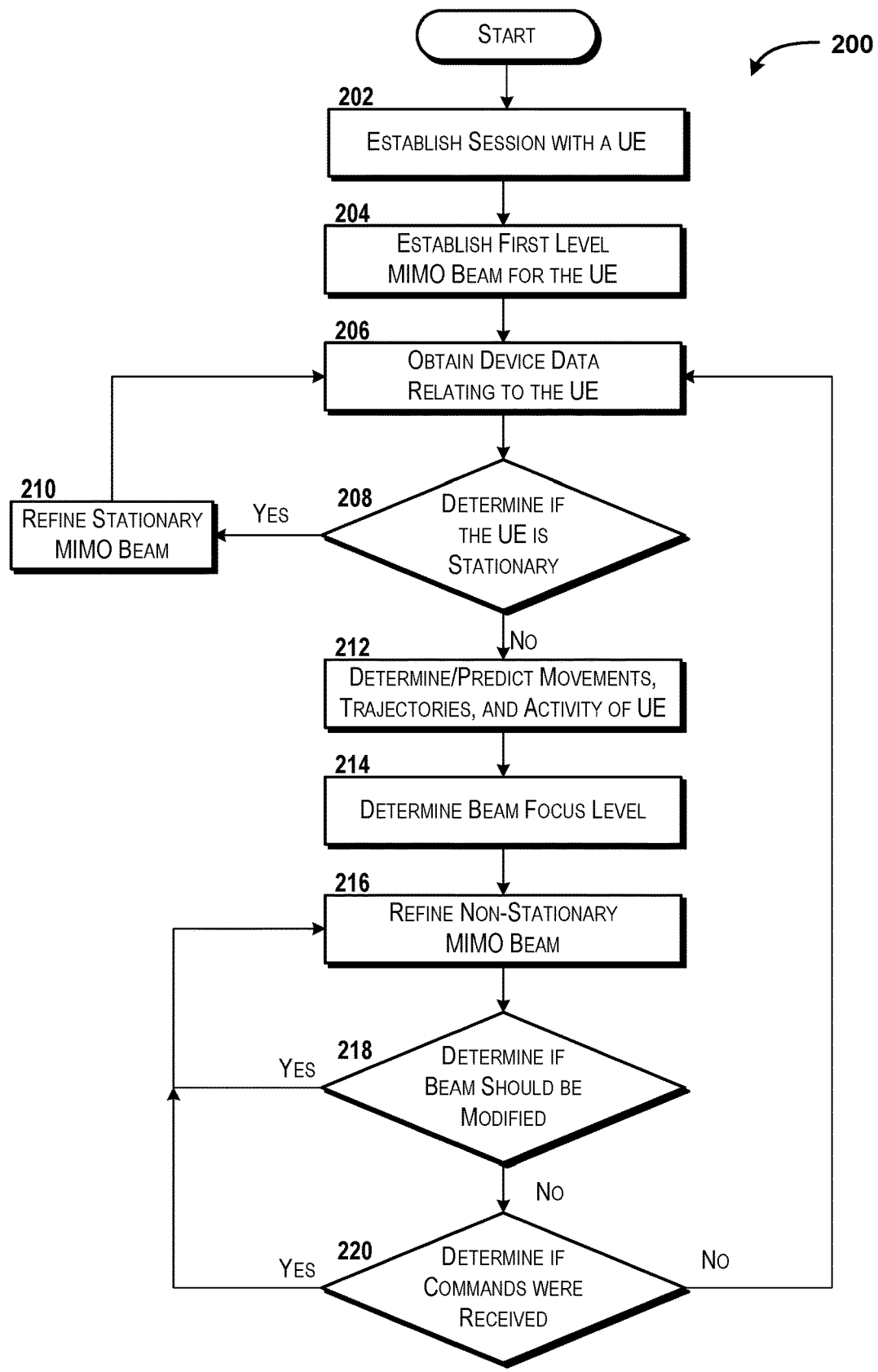
FIG. 2 is a flow diagram showing aspects of a method for establishing and refining beams in MIMO sessions, according to an illustrative embodiment of the concepts and technologies described herein.

Turning now to FIG. 2, aspects of a method 200 for establishing and refining beams in MIMO sessions will be described in detail, according to an illustrative embodiment of the concepts and technologies disclosed herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the controller 112 and/or the server computer 122, to perform one or more operations and/or causing the processor to direct other components of the computing system or device to perform one or more of the operations.

For purposes of illustrating and describing the concepts of the present disclosure, the method 200 is described herein as being performed by the controller 112 via execution of one or more software modules such as, for example, a MIMO beamforming application or module (not visible in the FIGURES). It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins at operation 202. At operation 202, the controller 112 can cause the cell site 110 to establish a voice or data session with a user equipment 102. According to various embodiments of the concepts and technologies disclosed herein, the session established in operation 202 can correspond to a MIMO session and therefore can be supported by one or more antenna arrays 114. In some embodiments of the concepts and technologies disclosed herein, the session established or detected in operation 202 can correspond to a multi-user ("MU") MIMO session, which can include the use of one or more portions of the antenna array 114 (e.g., one or more groups of antenna array elements 116) to support the session. It should be understood that these example embodiments are illustrative, and therefore should not be construed as being limiting in any way.

From operation 202, the method 200 can proceed to operation 204. At operation 204, the controller 112 can establish a first level MIMO beam for the user equipment 102. According to various embodiments of the concepts and technologies disclosed herein, the first level MIMO beam can be provided by all or a number of the available antenna array elements 116 associated with a particular cell site 110. The number of antenna array elements 116 used at the first level can be predetermined and can range from two antenna array elements 116 to all antenna array elements 116. Thus, it can be appreciated that when a session is initiated, the MIMO beam associated with the session can correspond to a wide area or broadcast beam that may be directed in more than one direction, etc. It should be understood that this example is illustrative, and therefore should not be construed as being limiting in any way.

From operation 204, the method 200 can proceed to operation 206. At operation 206, the controller 112 can obtain device data 118 relating to the user equipment 102 associated with the session established or detected in operation 202. As explained herein, the device data 118 can be obtained from the user equipment 102, from one or more network monitors and/or other entities associated with the cell site 110, and/or from other entities. The device data 118 can include contextual data, movement data, connection data, and/or other data as illustrated and described herein with reference to FIG. 1A. It should be understood that this example is illustrative, and therefore should not be construed as being limiting in any way.

From operation 206, the method 200 can proceed to operation 208. At operation 208, the controller 112 can determine if the user equipment 102 associated with the session established or detected in operation 202 is stationary or non-stationary. According to various embodiments of the concepts and technologies disclosed herein, the controller 112 can make the determination of operation 208 by analyzing the device data 118 and determining, based on the device data 118, if the user equipment 102 is moving or stationary. Of course, the controller 112 can instead determine, in operation 208, if the user equipment 102 is mobile or non-mobile, etc. Thus, the illustrated embodiment is illustrative and should not be construed as being limiting in any way.

If the controller 112 determines, in operation 208, that the user equipment 102 associated with the session established or detected in operation 202 is stationary, the method 200 can proceed to operation 210. At operation 210, the controller 112 can refine (or effect refinement of) the MIMO beam to a minimum number of antenna array elements 116 that can provide the requested service at a requested or required service level commitment. Thus, operation 210 can include determining how many antenna array elements 116 are required to provide the beam to the user equipment 102 and deallocating or deactivating any antenna array elements 116 that are not needed to provide the beam to the user equipment 102. It should be understood that this example is illustrative, and therefore should not be construed as being limiting in any way.

If the controller 112 determines, in operation 208, that the user equipment 102 associated with the session established or detected in operation 202 is non-stationary (or alternatively that the user equipment 102 is mobile), the method 200 can proceed to operation 212. At operation 212, the controller 112 can analyze the device data 118 and identify and/or predict, based on the device data 118, one or more movements, trajectories, and/or activities of the user equipment 102. As explained above, the device data 118 can include contextual data that can describe activities of the user equipment 102, movement data that can describe locations, trajectories, speeds, etc., of the user equipment 102, connection data that can describe power levels of the communication hardware of the user equipment 102, and/or other data that can describe other aspects of the user equipment 102 and/or the session. Thus, operation 212 can include analyzing the device data 118 to determine resource needs associated with the session, movements of the user equipment 102, and/or other aspects of the communication session established in operation 202.

From operation 212, the method 200 can proceed to operation 214. At operation 214, the controller 112 can determine a beam focus level to use for the session established or detected in operation 202 based on the movements, trajectories, and activity determined in operation 212 and based on an overall desire to minimize resource usage associated with the beam as explained above. Thus, in operation 214 the controller 112 can determine how many antenna array elements 116 are required to support the beam associated with the session based on movements of the user equipment 102 and/or predicted movements of the user equipment 102, resource needs associated with the session, and one or more connection parameters (e.g., power levels, etc.). Again, in some embodiments the controller 112 can be configured to use a narrowest beam possible (e.g., a beam generated by the smallest number of antenna array elements 116 possible) while meeting a service commitment. It should be understood that this example is illustrative, and therefore should not be construed as being limiting in any way.

From operation 214, the method 200 can proceed to operation 216. At operation 216, the controller 112 can refine the non-stationary MIMO beam in accordance with the beam focus level as determined in operation 214. In a first iteration of operation 216, for example, the controller 112 can be configured to refine the non-stationary MIMO beam from the first level (as established in operation 204) to the level determined in operation 214. In some other iterations of operation 216, the focus level of the MIMO beam can be changed in operation 216 by further narrowing the MIMO beam or by widening the MIMO beam; by moving the MIMO beam from one antenna array element 116 to a different antenna array element 116 (e.g., to track movements of a user equipment 102); a handoff of the beam (from one antenna array element 116 at one cell site 110 to a different antenna array element 116 at a second cell site 110); or other changes that can be made to the MIMO beam. Thus, it can be appreciated that the MIMO beam can be refined by the controller 112 multiple times without iterating the operation illustrated and described herein in operation 204 for establishing the MIMO beam at a first level. It should be understood that this example is illustrative, and therefore should not be construed as being limiting in any way.

From operation 216, the method 200 can proceed to operation 218. At operation 218, the controller 112 can determine if the MIMO beam associated with the session established or detected in operation 202 should be modified based on a movement associated with the user equipment 102. Thus, it can be appreciated that operation 218 can include the controller 112 determining, based on the movements, trajectories, and activity of the user equipment 102, if the beam should be narrowed, widened, moved, handed off, etc.

If the controller 112 determines, in operation 218, that the MIMO beam associated with the session established or detected in operation 202 should be modified, the method 200 can return to operation 216, and the controller 112 can again refine the non-stationary MIMO beam. Thus, operations 216-218 can be iterated until the controller 112 determines, in any iteration of operation 218, that the MIMO beam should not be modified.

If the controller 112 determines, in operation 218, that the MIMO beam associated with the session established or detected in operation 202 should not be modified, the method 200 can proceed to operation 220. At operation 220, the controller 112 can determine if commands such as the MIMO beamforming commands 124 have been received by the controller 112. Such commands can be received outside of the method 200 illustrated and described in FIG. 2, and as such, the controller 112 may need to implement commands outside of the flow of the method 200. If the controller 112 determines, in operation 220, that commands such as the MIMO beamforming commands 124 have been received by the controller 112, the method 200 can return to operation 216, and the controller 112 can again refine the non-stationary MIMO beam, this time based on the beamforming commands 124 received by the controller 112. If the controller 112 determines, in operation 220, that commands such as the MIMO beamforming commands 124 have not been received by the controller 112, the method 200 can return to operation 206, and the controller 112 can obtain device data 118 associated with the user equipment 102.

It can be appreciated with reference to FIG. 2 that the functionality associated with the method 200 can be iterated by the controller 112 any number of times until the session between the user equipment 102 and the network (e.g., the network associated with the controller 112) ends. It should be understood that this example is illustrative, and therefore should not be construed as being limiting in any way.

Figure 3:
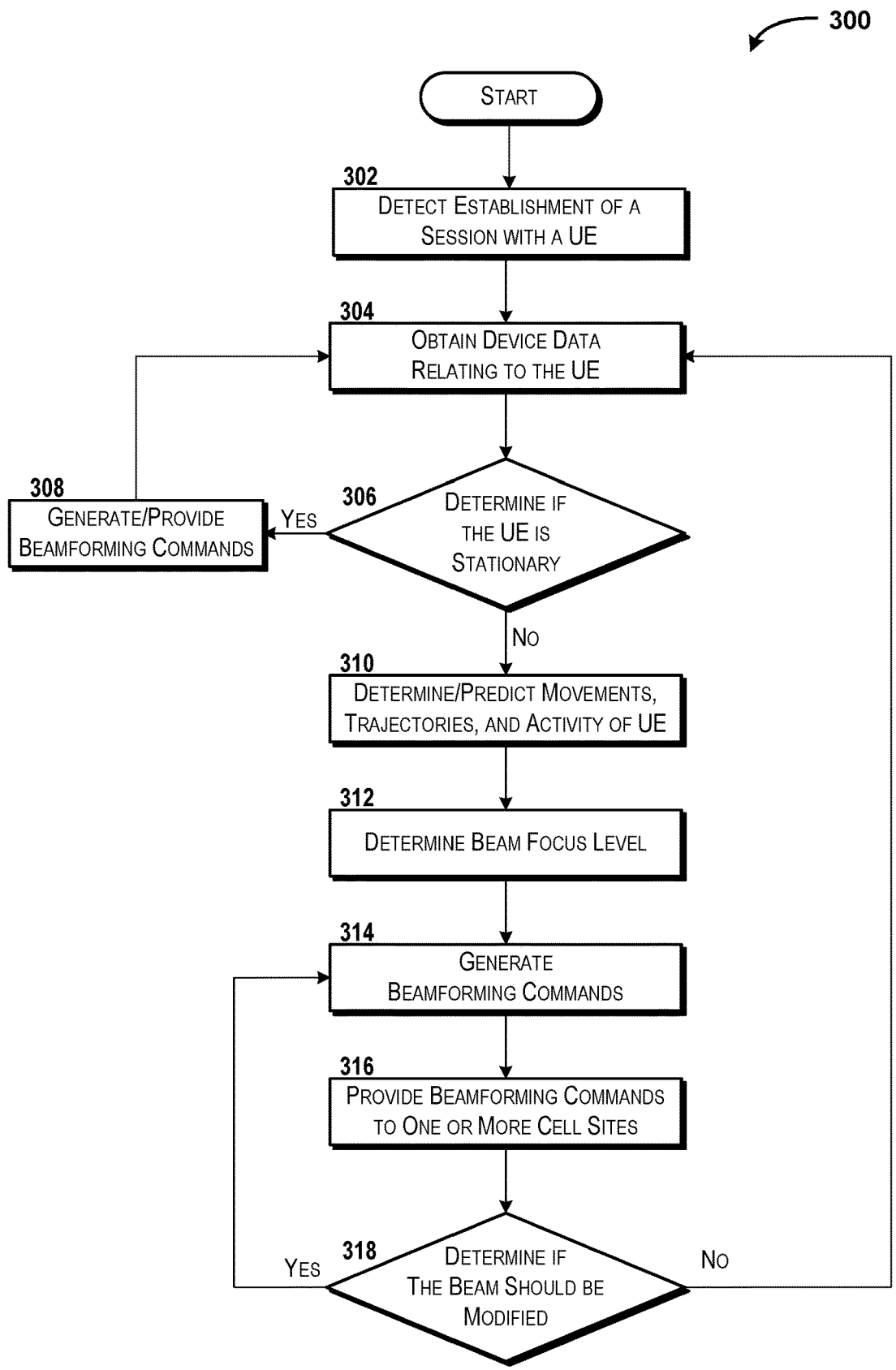
FIG. 3 is a flow diagram showing aspects of a method for establishing and refining beams in MIMO sessions, according to another illustrative embodiment of the concepts and technologies described herein.

Turning now to FIG. 3, aspects of a method 300 for establishing and refining beams in MIMO sessions will be described in detail, according to another illustrative embodiment of the concepts and technologies disclosed herein. For purposes of illustrating and describing the concepts of the present disclosure, the method 300 is described herein as being performed by the server computer 122 via execution of one or more software modules such as, for example, the MIMO beamforming service 120. It should be understood that additional and/or alternative devices and/or network nodes can provide the functionality described herein via execution of one or more modules, applications, and/or other software including, but not limited to, the MIMO beamforming service 120. Thus, the illustrated embodiments are illustrative, and should not be viewed as being limiting in any way.

The method 300 begins at operation 302. At operation 302, the server computer 122 can detect establishment of a session between a cell site 110 and a user equipment 102. According to various embodiments of the concepts and technologies disclosed herein, the server computer 122 can detect the establishment of the session in operation 302 based on a report from a cell site 110, based on receiving the device data 118, and/or based on other events or information. According to various embodiments of the concepts and technologies disclosed herein, the session established or detected in operation 302 can correspond to a MIMO session and/or a MU-MISO session. As mentioned above, the session can be established at a first level, e.g., using a first number of antenna array elements 116 (at least two antenna array elements are required in accordance with various embodiments of the concepts and technologies disclosed herein). According to various embodiments of the concepts and technologies disclosed herein, the first level MIMO beam can be provided by all or a number of the available antenna array elements 116 associated with a particular cell site 110. The number of antenna array elements 116 used at the first level can be predetermined and can range from two antenna array elements 116 to all antenna array elements 116. Thus, it can be appreciated that when a session is initiated, the MIMO beam associated with the session can correspond to a wide area or broadcast beam that may be directed in more than one direction, etc. It should be understood that this example is illustrative, and therefore should not be construed as being limiting in any way.

From operation 302, the method 300 can proceed to operation 304. At operation 304, the server computer 122 can obtain device data 118 relating to the user equipment 102 associated with the session established or detected in operation 302. As explained herein, the device data 118 can be obtained from the user equipment 102, from one or more network monitors and/or other entities associated with the cell site 110, and/or from other entities. The device data 118 can include contextual data, movement data, connection data, and/or other data as illustrated and described herein with reference to FIG. 1A. It should be understood that this example is illustrative, and therefore should not be construed as being limiting in any way.

From operation 304, the method 300 can proceed to operation 306. At operation 306, the server computer 122 can determine if the user equipment 102 associated with the session detected in operation 302 is stationary or non-stationary. According to various embodiments of the concepts and technologies disclosed herein, the server computer 122 can make the determination of operation 306 by analyzing the device data 118 and determining, based on the device data 118, if the user equipment 102 is moving or stationary. Of course, the server computer 122 can instead determine, in operation 306, if the user equipment 102 is mobile or non-mobile, etc. Thus, the illustrated embodiment is illustrative and should not be construed as being limiting in any way.

If the server computer 122 determines, in operation 306, that the user equipment 102 associated with the session detected in operation 302 is stationary, the method 300 can proceed to operation 308. At operation 308, the server computer 122 can generate and provide one or more beamforming commands 124 to the cell site 110 and/or an entity thereof. The beamforming commands 124, when implemented by the cell site 110 and/or the entity thereof, can cause the cell site 110 or entity thereof (e.g., the controller 112) to refine or effect refinement of the MIMO beam to a minimum number of antenna array elements 116 that can provide the requested service at a requested or required service level commitment. Thus, operation 308 can include the server computer 122 determining how many antenna array elements 116 are required to provide the beam to the user equipment 102 and generating beamforming commands 124 to cause the cell site 110 to deallocate or deactivate any antenna array elements 116 that are not needed to provide the beam to the user equipment 102. It should be understood that this example is illustrative, and therefore should not be construed as being limiting in any way.

If the server computer 122 determines, in operation 306, that the user equipment 102 associated with the session detected in operation 302 is non-stationary (or alternatively that the user equipment 102 is mobile), the method 300 can proceed to operation 310. At operation 310, the server computer 122 can analyze the device data 118 and identify and/or predict, based on the device data 118, one or more movements, trajectories, and/or activities of the user equipment 102. As explained above, the device data 118 can include contextual data that can describe activities of the user equipment 102, movement data that can describe locations, trajectories, speeds, etc., of the user equipment 102, connection data that can describe power levels of the communication hardware of the user equipment 102, and/or other data that can describe other aspects of the user equipment 102 and/or the session. Thus, operation 310 can include analyzing the device data 118 to determine resource needs associated with the session, movements of the user equipment 102, and/or other aspects of the communication session detected in operation 302.

From operation 310, the method 300 can proceed to operation 312. At operation 312, the server computer 122 can determine a beam focus level to use for the session detected in operation 302 based on the movements, trajectories, and activity determined in operation 310 and based on an overall desire to minimize resource usage associated with the beam as explained above. Thus, in operation 312 the server computer 122 can determine how many antenna array elements 116 are required to support the beam associated with the session based on movements of the user equipment 102 and/or predicted movements of the user equipment 102, resource needs associated with the session, and one or more connection parameters (e.g., power levels, etc.). Again, in some embodiments the server computer 122 can be configured to use a narrowest beam possible (e.g., a beam generated by the smallest number of antenna array elements 116 possible) while meeting a service commitment. It should be understood that this example is illustrative, and therefore should not be construed as being limiting in any way.

From operation 312, the method 300 can proceed to operation 314. At operation 314, the server computer 122 can generate one or more commands (e.g., the beamforming commands 124) that, when implemented by a cell site 110 and/or an entity thereof, can effect the refinement of the beam as determined in operation 312. Thus, operation 314 can include the server computer 122 generating the beamforming commands 124 where the beamforming commands 124, when implemented by the cell site 110 and/or an entity thereof, cause the cell site 110 to refine the non-stationary MIMO beam from the first level (as established by the cell site 110 and as detected in operation 302) to the beam focus level determined in operation 312.

In some other iterations of operation 314, the beamforming commands 124 can cause the recipient to change a focus level of the MIMO beam by further narrowing the MIMO beam or by widening the MIMO beam; by moving the MIMO beam from one antenna array element 116 to a different antenna array element 116 (e.g., to track movements of a user equipment 102); a handoff of the beam (from one antenna array element 116 at one cell site 110 to a different antenna array element 116 at a second cell site 110); or other changes that can be made to the MIMO beam. Thus, it can be appreciated that the MIMO beam can be refined multiple times via the beamforming commands 124 without having to reestablish the beam at a broadest or widest level. It should be understood that this example is illustrative, and therefore should not be construed as being limiting in any way.

From operation 314, the method 300 can proceed to operation 316. In operation 316, the server computer 122 can provide the one or more commands (e.g., the beamforming commands 124) generated in operation 314 to one or more cell sites (e.g., the cell site 110A with which the user equipment 102 is communicating and/or one or more neighboring cell sites 110).

From operation 316, the method 300 can proceed to operation 318. At operation 318, the server computer 122 can determine if the MIMO beam being used to support communications between a cell site 110 and the user equipment 102 should be modified. Thus, it can be appreciated that operation 316 can include the server computer 122 determining, based on the movements, trajectories, and activity of the user equipment 102, if the beam should be narrowed, widened, moved, handed off, etc.

If the server computer 122 determines, in operation 318, that the MIMO beam being used to support communications between a cell site 110 and the user equipment 102 should be modified, the method 300 can return to operation 314. At operation 314, the server computer 122 can again generate one or more commands such as, for example, the beamforming commands 124. These beamforming commands 124, when received by the cell site 110 or other entity, can cause the cell site 110 or other entity (e.g., the controller 112) to refine the MIMO beam. Thus, operations 314 through 318 can be iterated until the server computer 122 determines, in any iteration of operation 318, that the MIMO beam should not be modified.

If the server computer 122 determines, in operation 318, that the MIMO beam being used to support communications between a cell site 110 and the user equipment 102 should not be modified, the method 300 can return to operation 304. At operation 304, the server computer 122 can again obtain the device data 118 and the operations of the method 300 can be reiterated from operation 304.

It can be appreciated with reference to FIG. 3 that the functionality associated with the method 300 can be iterated by the server computer 122 any number of times until the session between the user equipment 102 and the network (e.g., the network associated with the cell sites 110) ends. It should be understood that this example is illustrative, and therefore should not be construed as being limiting in any way.

Figure 4:
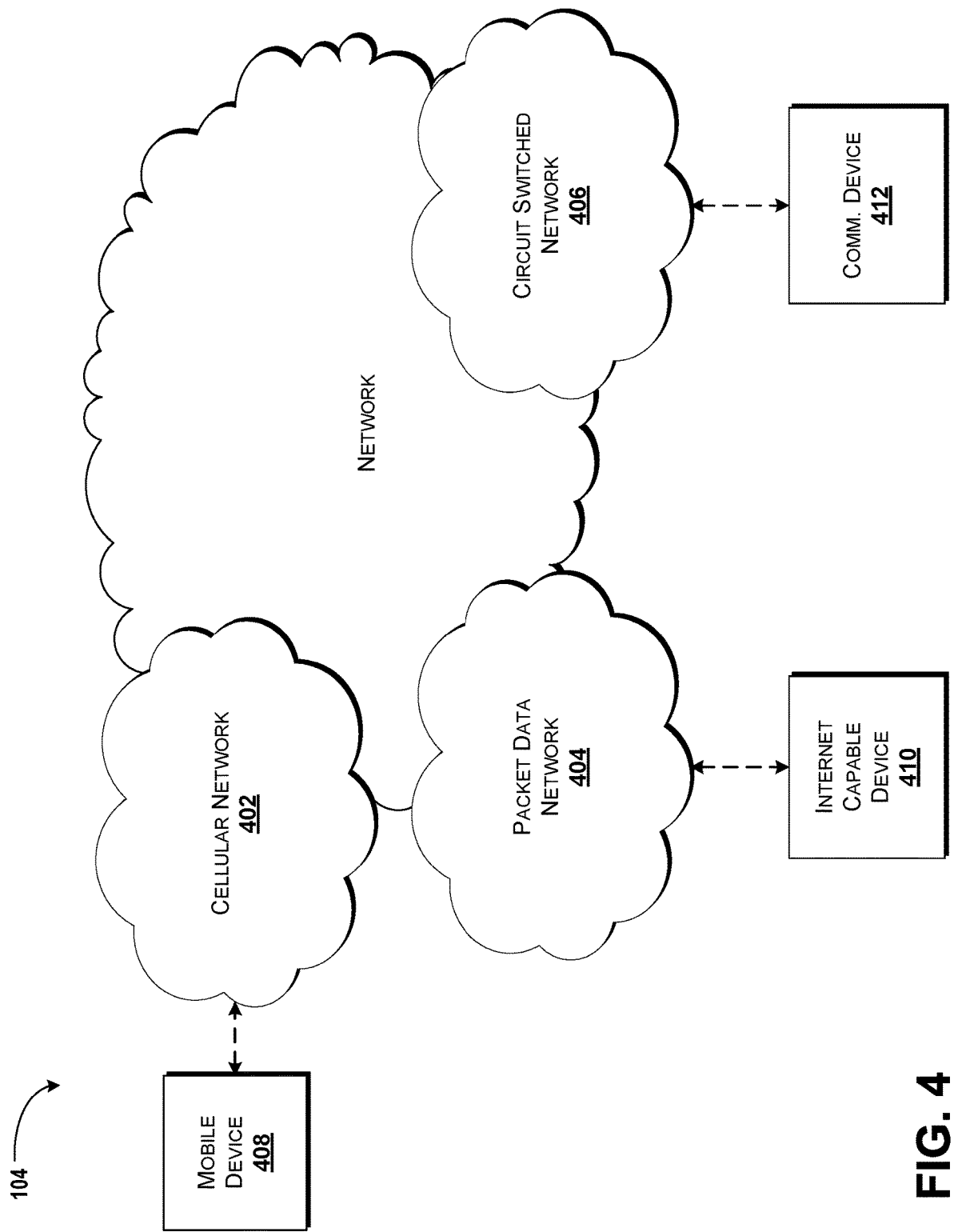
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSDPA), and HSPA+. The cellular network 402 also is compatible with 4G mobile communications standards, 5G mobile communications standards, other mobile communications standards, and evolved and future mobile communications standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
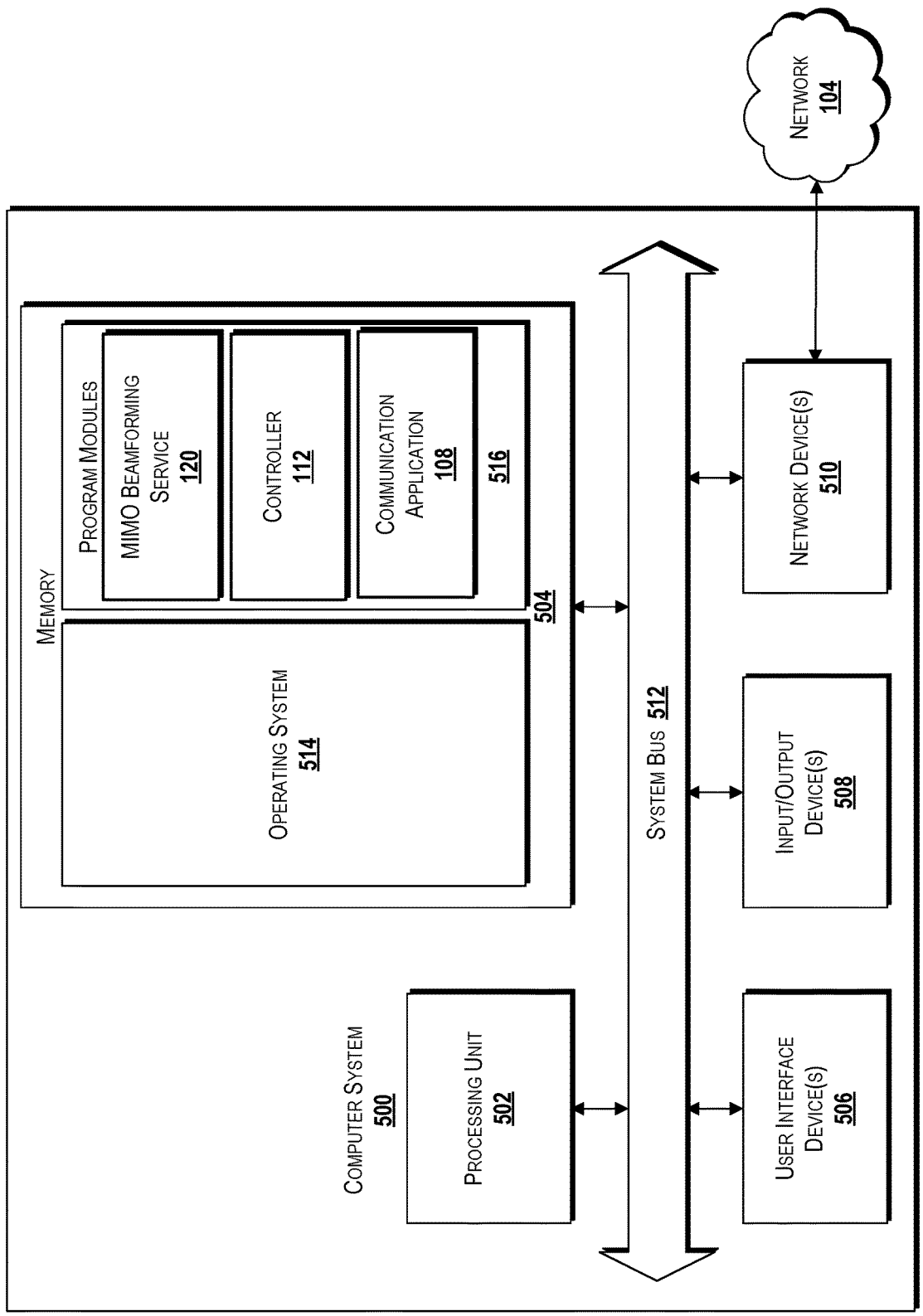
FIG. 5 is a block diagram illustrating an example computer system configured to establish and refine beams in MIMO sessions, according to some illustrative embodiments of the concepts and technologies described herein.

FIG. 5 is a block diagram illustrating a computer system 500 configured to provide the functionality described herein for establishing and refining beams in MIMO sessions, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include the communication application 108, the controller 112, and the MIMO beamforming service 120. These and/or other programs can be embodied in computer-readable media containing instructions that, when executed by the processing unit 502, perform one or more of the methods 200 and 300 described in detail above with respect to FIGS. 2 and 3 and/or other functionality as illustrated and described herein. It can be appreciated that, at least by virtue of the instructions embodying the methods 200 and 300, and/or other functionality illustrated and described herein being stored in the memory 504 and/or accessed and/or executed by the processing unit 502, the computer system 500 is a special-purpose computing system that can facilitate providing the functionality illustrated and described herein. According to embodiments, the program modules 516 may be embodied in hardware, software, firmware, or any combination thereof. Although not shown in FIG. 5, it should be understood that the memory 504 also can be configured to store the device data 118, the beamforming commands 124, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 6:
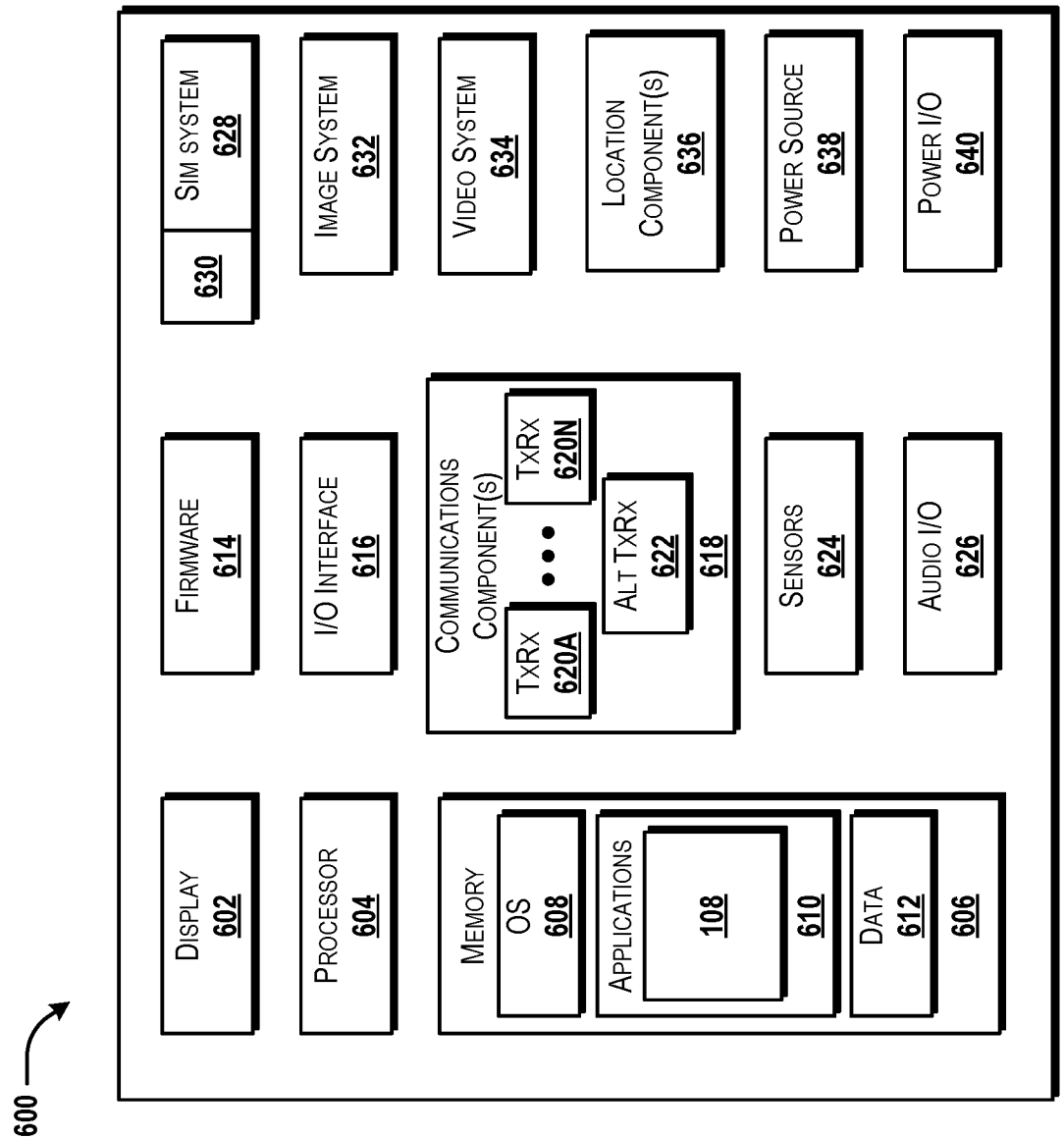
FIG. 6 is a block diagram illustrating an example mobile device configured to interact with a MIMO beamforming service, according to some illustrative embodiments of the concepts and technologies described herein.

Turning now to FIG. 6, an illustrative mobile device 600 and components thereof will be described. In some embodiments, the user equipment 102 described above with reference to FIGS. 1A-4 can be configured as and/or can have an architecture similar or identical to the mobile device 600 described herein in FIG. 6. It should be understood, however, that the user equipment 102 may or may not include the functionality described herein with reference to FIG. 6. While connections are not shown between the various components illustrated in FIG. 6, it should be understood that some, none, or all of the components illustrated in FIG. 6 can be configured to interact with one another to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements such as, for example, text, images, video, virtual keypads and/or keyboards, messaging data, notification messages, metadata, internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610 such as the communication application 108, other computer-executable instructions stored in a memory 606, or the like. In some embodiments, the applications 610 also can include a UI application (not illustrated in FIG. 6).

The UI application can interface with the operating system 608, (such as the operating system 106 shown in FIG. 1A), to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, configuring settings, manipulating address book content and/or settings, multi-mode interaction, interacting with other applications 610, and otherwise facilitating user interaction with the operating system 608, the applications 610, and/or other types or instances of data 612 that can be stored at the mobile device 600. The data 612 can include, for example, device data 118, beamforming commands 124, and/or other applications or program modules. According to various embodiments, the data 612 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604.

It can be appreciated that, at least by virtue of storage of the instructions corresponding to the applications 610 and/or other instructions embodying other functionality illustrated and described herein in the memory 606, and/or by virtue of the instructions corresponding to the applications 610 and/or other instructions embodying other functionality illustrated and described herein being accessed and/or executed by the processor 604, the mobile device 600 is a special-purpose mobile device that can facilitate providing the functionality illustrated and described herein. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, contextual data, connection data, user information, organization information, presence status information, user IDs, passwords, and application initiation (start-up) requests. In some embodiments, the I/O interface 616 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks such as the network 104 described herein. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMAONE, CDMA2000, LTE, and various other 2G, 2.5G, 3G, 4G, 5G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family including HSDPA, EUL or otherwise termed HSUPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted-GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
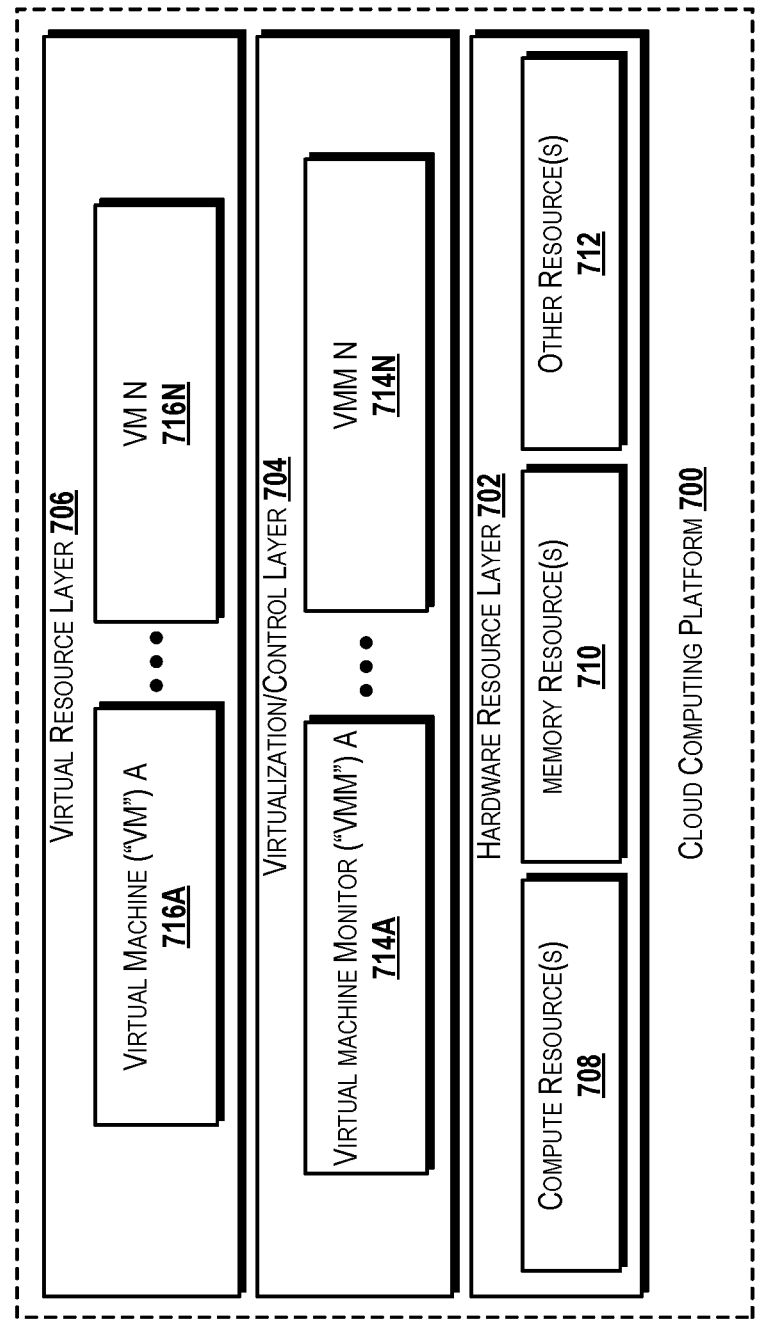
FIG. 7 is a diagram illustrating a computing environment capable of implementing aspects of the concepts and technologies disclosed herein, according to some illustrative embodiments of the concepts and technologies described herein.

FIG. 7 illustrates an illustrative architecture for a cloud computing platform 700 that can be capable of executing the software components described herein for establishing and refining beams in MIMO sessions and/or for interacting with the MIMO beamforming service 120. Thus, it can be appreciated that in some embodiments of the concepts and technologies disclosed herein, the cloud computing platform 700 illustrated in FIG. 7 can be used to provide the functionality described herein with respect to the controller 112, the server computer 122, the user equipment 102, and/or other devices illustrated and described herein.

The cloud computing platform 700 thus may be utilized to execute any aspects of the software components presented herein. Thus, according to various embodiments of the concepts and technologies disclosed herein, the communication application 108, the controller 112, and/or the MIMO beamforming service 120 can be implemented, at least in part, on or by elements included in the cloud computing platform 700 illustrated and described herein. Those skilled in the art will appreciate that the illustrated cloud computing platform 700 is a simplification of but only one possible implementation of an illustrative cloud computing platform, and as such, the illustrated cloud computing platform 700 should not be construed as being limiting in any way.

In the illustrated embodiment, the cloud computing platform 700 can include a hardware resource layer 702, a virtualization/control layer 704, and a virtual resource layer 706. These layers and/or other layers can be configured to cooperate with each other and/or other elements of a cloud computing platform 700 to perform operations as will be described in detail herein. While connections are shown between some of the components illustrated in FIG. 7, it should be understood that some, none, or all of the components illustrated in FIG. 7 can be configured to interact with one another to carry out various functions described herein. In some embodiments, the components are arranged so as to communicate via one or more networks such as, for example, the network 104 illustrated and described hereinabove (not shown in FIG. 7). Thus, it should be understood that FIG. 7 and the following description are intended to provide a general understanding of a suitable environment in which various aspects of embodiments can be implemented, and should not be construed as being limiting in any way.

The hardware resource layer 702 can provide hardware resources. In the illustrated embodiment, the hardware resources can include one or more compute resources 708, one or more memory resources 710, and one or more other resources 712. The compute resource(s) 708 can include one or more hardware components that can perform computations to process data, and/or to execute computer-executable instructions of one or more application programs, operating systems, services, and/or other software including, but not limited to, the communication application 108, the controller 112, and/or the MIMO beamforming service 120 illustrated and described herein.

According to various embodiments, the compute resources 708 can include one or more central processing units ("CPUs"). The CPUs can be configured with one or more processing cores. In some embodiments, the compute resources 708 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 708 can include one or more discrete GPUs. In some other embodiments, the compute resources 708 can include one or more CPU and/or GPU components that can be configured in accordance with a co-processing CPU/GPU computing model. Thus, it can be appreciated that in some embodiments of the compute resources 708, a sequential part of an application can execute on a CPU and a computationally-intensive part of the application can be accelerated by the GPU. It should be understood that this example is illustrative, and therefore should not be construed as being limiting in any way.

In some embodiments, the compute resources 708 also can include one or more system on a chip ("SoC") components. It should be understood that the an SoC component can operate in association with one or more other components as illustrated and described herein, for example, one or more of the memory resources 710 and/or one or more of the other resources 712. In some embodiments in which an SoC component is included, the compute resources 708 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 708 can be or can include one or more hardware components arranged in accordance with an ARM architecture, available for license from ARM HOLDINGS of Cambridge, United Kingdom. Alternatively, the compute resources 708 can be or can include one or more hardware components arranged in accordance with an x86 architecture, such as an architecture available from INTEL CORPORATION of Mountain View, Calif., and others. Those skilled in the art will appreciate the implementation of the compute resources 708 can utilize various computation architectures and/or processing architectures. As such, the various example embodiments of the compute resources 708 as mentioned hereinabove should not be construed as being limiting in any way. Rather, implementations of embodiments of the concepts and technologies disclosed herein can be implemented using compute resources 708 having any of the particular computation architecture and/or combination of computation architectures mentioned herein as well as other architectures.

Although not separately illustrated in FIG. 7, it should be understood that the compute resources 708 illustrated and described herein can host and/or execute various services, applications, portals, and/or other functionality illustrated and described herein. Thus, the compute resources 708 can host and/or can execute the communication application 108, the controller 112, and/or the MIMO beamforming service 120 illustrated and described herein.

The memory resource(s) 710 can include one or more hardware components that can perform or provide storage operations, including temporary and/or permanent storage operations. In some embodiments, the memory resource(s) 710 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 708, subject to the definition of "computer storage media" provided above (e.g., as excluding waves and signals per se and/or communication media as defined in this application).

Although not illustrated in FIG. 7, it should be understood that the memory resources 710 can host or store the various data illustrated and described herein including, but not limited to, the device data 118, the beamforming commands 124, and/or other data, if desired. It should be understood that this example is illustrative, and therefore should not be construed as being limiting in any way.

The other resource(s) 712 can include any other hardware resources that can be utilized by the compute resources(s) 708 and/or the memory resource(s) 710 to perform operations. The other resource(s) 712 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 702 can be virtualized by one or more virtual machine monitors ("VMMs") 714A-714N (also known as "hypervisors;" hereinafter "VMMs 714"). The VMMs 714 can operate within the virtualization/control layer 704 to manage one or more virtual resources that can reside in the virtual resource layer 706. The VMMs 714 can be or can include software, firmware, and/or hardware that alone or in combination with other software, firmware, and/or hardware, can manage one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). In the illustrated embodiment, the virtual resource layer 706 includes VMs 716A-716N (hereinafter "VMs 716").

Based on the foregoing, it should be appreciated that systems and methods for establishing and refining beams in MIMO sessions have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   a processor; and
   a memory that stores computer-executable instructions that, when executed by the processor, cause the processor to perform operations comprising
      detecting establishment of a communication session between a cell site and a user equipment, wherein the communication session is conducted using a multi-input multi-output beam that is supported by a first portion of an antenna array, the first portion comprising a plurality of antenna array elements of the antenna array,
      obtaining device data that relates to the user equipment, wherein the device data comprises movement data that describes a movement of the user equipment,
      generating a beamforming command comprising instructions that, when implemented by an entity associated with the cell site, causes the entity to refine the multi-input multi-output beam based on the device data, wherein a refined multi-input multi-output beam is supported by a second portion of the antenna array, and
      providing the beamforming command to the cell site.

2. The system of claim 1, wherein the movement data describes a direction of travel of the user equipment and a speed of travel of the user equipment.

3. The system of claim 1, wherein the computer-executable instructions, when executed by the processor, cause the processor to perform operations further comprising:
   determining, based on the device data, if the user equipment is stationary; and
   generating the beamforming command in response to a determination that the user equipment is stationary, wherein the beamforming command causes the entity to deactivate a first antenna element that is included in the first portion of the antenna array and that is not included in the second portion of the antenna array.

4. The system of claim 1, wherein the computer-executable instructions, when executed by the processor, cause the processor to perform operations further comprising:
   determining, based on the device data, if the user equipment is stationary; and
   in response to a determination that the user equipment is not stationary,
      identifying or predicting movements of the user equipment,
      determining a beam focus level, and
      generating the beamforming command, wherein the beamforming command causes the entity to deactivate a first antenna element that is included in the first portion of the antenna array and that is not included in the second portion of the antenna array.

5. The system of claim 1, wherein the computer-executable instructions, when executed by the processor, cause the processor to perform operations further comprising:
   determining, based on the device data, if the multi-input multi-output beam should be modified; and
   generating the beamforming command in response to a determination that the multi-input multi-output beam should be modified, wherein the beamforming command causes the entity to deactivate a first antenna element that is included in the first portion of the antenna array and that is not included in the second portion of the antenna array.

6. The system of claim 1, wherein the first portion of the antenna array comprises a first antenna array element of the antenna array, and wherein the second portion of the antenna array comprises a second antenna array element of the antenna array.

7. The system of claim 1, wherein the first portion of the antenna array comprises a first antenna array element and does not include a second antenna array element, and wherein the second portion of the antenna array comprises the second antenna array element and does not include the first antenna array element.

8. The system of claim 1, wherein the first portion of the antenna array comprises a first antenna array element of a first antenna array comprising the antenna array, and wherein the second portion of the antenna array comprises a second antenna array element of a second antenna array that does not include the antenna array.

9. The system of claim 1, wherein the computer-executable instructions, when executed by the processor, cause the processor to perform operations further comprising:
   determining, based on the device data, if the multi-input multi-output beam should be modified; and
   generating the beamforming command in response to a determination that the multi-input multi-output beam should be modified, wherein the beamforming command causes the cell site to change an aim of a first antenna element that is included in the first portion of the antenna array.

10. The system of claim 1, wherein the computer-executable instructions, when executed by the processor, cause the processor to perform operations further comprising:
    determining, based on the device data, if the multi-input multi-output beam should be modified; and
    generating the beamforming command in response to a determination that the multi-input multi-output beam should be modified, wherein the beamforming command causes the cell site to change a power level of a first antenna element that is included in the first portion of the antenna array.

11. A method comprising:
    detecting, by a computer comprising a processor, establishment of a communication session between a cell site and a user equipment, wherein the communication session is conducted using a multi-input multi-output beam that is supported by a first portion of an antenna array, the first portion comprising a plurality of antenna array elements of the antenna array,
    obtaining, by the processor, device data that relates to the user equipment, wherein the device data comprises movement data that describes a movement of the user equipment,
    generating, by the processor, a beamforming command comprising instructions that, when implemented by an entity associated with the cell site, causes the entity to refine the multi-input multi-output beam based on the device data, wherein a refined multi-input multi-output beam is supported by a second portion of the antenna array, and providing, by the processor, the beamforming command to the cell site.

12. The method of claim 11, wherein the movement data describes a direction of travel of the user equipment and a speed of travel of the user equipment.

13. The method of claim 11, further comprising:
determining, based on the device data, if the user equipment is stationary; and
generating the beamforming command in response to a determination that the user equipment is stationary, wherein the beamforming command causes the entity to deactivate a first antenna element that is included in the first portion of the antenna array and that is not included in the second portion of the antenna array.

14. The method of claim 11, further comprising:
determining, based on the device data, if the user equipment is stationary; and
in response to a determination that the user equipment is not stationary,
identifying or predicting movements of the user equipment,
determining a beam focus level, and
generating the beamforming command, wherein the beamforming command causes the entity to deactivate a first antenna element that is included in the first portion of the antenna array and that is not included in the second portion of the antenna array.

15. The method of claim 11, further comprising:
determining, based on the device data, if the multi-input multi-output beam should be modified; and
generating the beamforming command in response to a determination that the multi-input multi-output beam should be modified, wherein the beamforming command causes the entity to deactivate a first antenna element that is included in the first portion of the antenna array and that is not included in the second portion of the antenna array.

16. A computer storage medium having computer-executable instructions stored thereon that, when executed by a processor, cause the processor to perform operations comprising:
detecting establishment of a communication session between a cell site and a user equipment, wherein the communication session is conducted using a multi-input multi-output beam that is supported by a first portion of an antenna array, the first portion comprising a plurality of antenna array elements of the antenna array,
obtaining device data that relates to the user equipment, wherein the device data comprises movement data that describes a movement of the user equipment,
generating a beamforming command comprising instructions that, when implemented by an entity associated with the cell site, causes the entity to refine the multi-input multi-output beam based on the device data, wherein a refined multi-input multi-output beam is supported by a second portion of the antenna array, and
providing the beamforming command to the cell site.

17. The computer storage medium of claim 16, wherein the movement data describes a direction of travel of the user equipment and a speed of travel of the user equipment.

18. The computer storage medium of claim 16, wherein the computer-executable instructions, when executed by the processor, cause the processor to perform operations further comprising:
determining, based on the device data, if the user equipment is stationary; and
generating the beamforming command in response to a determination that the user equipment is stationary, wherein the beamforming command causes the entity to deactivate a first antenna element that is included in the first portion of the antenna array and that is not included in the second portion of the antenna array.

19. The computer storage medium of claim 16, wherein the computer-executable instructions, when executed by the processor, cause the processor to perform operations further comprising:
determining, based on the device data, if the user equipment is stationary; and
in response to a determination that the user equipment is not stationary,
identifying or predicting movements of the user equipment,
determining a beam focus level, and
generating the beamforming command, wherein the beamforming command causes the entity to deactivate a first antenna element that is included in the first portion of the antenna array and that is not included in the second portion of the antenna array.

20. The computer storage medium of claim 16, wherein the computer-executable instructions, when executed by the processor, cause the processor to perform operations further comprising:
determining, based on the device data, if the multi-input multi-output beam should be modified; and
generating the beamforming command in response to a determination that the multi-input multi-output beam should be modified, wherein the beamforming command causes the entity to deactivate a first antenna element that is included in the first portion of the antenna array and that is not included in the second portion of the antenna array.

* * * * *